in certain embodiments, this disclosure discloses a signal transmission method. The method may include receiving first configuration information from a network device. The first configuration information includes at least two sets of control channel parameters, and each set of the at least two sets of control channel parameters corresponds to at least one time unit. The method may include determining, based on an index of a time unit and the first configuration information, a control channel parameter corresponding to the time unit represented by the index.

United States Patent
Jiao et al.

(10) Patent No.: US 11,251,912 B2
(45) Date of Patent: Feb. 15, 2022

(54) SIGNAL TRANSMISSION METHOD, RELATED APPARATUS, AND SYSTEM

(71) Applicant: Huawei Technologies Co., Ltd., Shenzhen (CN)

(72) Inventors: Shurong Jiao, Shanghai (CN); Peng Zhang, Shanghai (CN); Hao Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 30 days.

(21) Appl. No.: 16/714,364

(22) Filed: Dec. 13, 2019

(65) Prior Publication Data

US 2020/0119865 A1 Apr. 16, 2020

Related U.S. Application Data

(63) Continuation of application No. PCT/CN2018/091682, filed on Jun. 15, 2018.

(30) Foreign Application Priority Data

Jun. 16, 2017 (CN) .......................... 201710462040.1

(51) Int. Cl.
*H04L 5/00* (2006.01)
*H04W 72/04* (2009.01)

(52) U.S. Cl.
CPC .......... *H04L 5/0005* (2013.01); *H04L 5/0092* (2013.01); *H04W 72/0406* (2013.01); *H04W 72/044* (2013.01)

(58) Field of Classification Search
CPC ... H04L 5/0005; H04L 5/0092; H04L 5/0091; H04L 5/0053; H04W 72/12;
(Continued)

(56) References Cited

U.S. PATENT DOCUMENTS 9,603,138 B2 3/2017 Zhao et al.
2015/0029981 A1 1/2015 Takahashi et al.
(Continued)

FOREIGN PATENT DOCUMENTS

CN 103580838 A 2/2014
CN 105453672 A 3/2016
(Continued)

OTHER PUBLICATIONS

Ericsson, "On Mixed Numerology", 3GPP TSG-RAN WG1 #89, R1-1709094, May 15-19, 2017, 3 pages, Hangzhou, China.
(Continued)

*Primary Examiner* — Maharishi V Khirodhar
*Assistant Examiner* — Kenneth P Hunt
(74) *Attorney, Agent, or Firm* — Slater Matsil, LLP

(57) ABSTRACT

In certain embodiments, this disclosure discloses a signal transmission method. The method may include receiving first configuration information from a network device. The first configuration information includes at least two sets of control channel parameters, and each set of the at least two sets of control channel parameters corresponds to at least one time unit. The method may include determining, based on an index of a time unit and the first configuration information, a control channel parameter corresponding to the time unit represented by the index.

20 Claims, 22 Drawing Sheets

(58) Field of Classification Search
CPC . H04W 72/0406; H04W 72/04; H04W 28/02; H04W 72/044
See application file for complete search history.

(56) References Cited

U.S. PATENT DOCUMENTS

| | | | |
|---|---|---|---|
| 2015/0029984 A1 | 1/2015 | Wang | |
| 2015/0063281 A1* | 3/2015 | Xu | H04L 5/0051 370/329 |
| 2015/0181579 A1 | 6/2015 | Aiba et al. | |
| 2018/0070341 A1 | 3/2018 | Islam et al. | |
| 2018/0368116 A1* | 12/2018 | Liao | H04L 5/0053 |
| 2020/0015241 A1 | 1/2020 | Marinier et al. | |
| 2020/0036497 A1 | 1/2020 | Xu | |
| 2020/0052846 A1* | 2/2020 | Takeda | H04L 5/0053 |
| 2020/0084752 A1* | 3/2020 | strom | H04W 72/042 |
| 2020/0119965 A1* | 4/2020 | Harada | H04W 72/04 |

FOREIGN PATENT DOCUMENTS

| | | |
|---|---|---|
| CN | 106059738 A | 10/2016 |
| WO | 2018041251 A1 | 3/2018 |
| WO | 2018184470 A1 | 10/2018 |

OTHER PUBLICATIONS

Mediatek Inc.,"DCI Aggregation in 2-stage DCI", 3GPP TSG RAN WG1 #88, R1-1702723, Feb. 13-17, 2017, 5 pages, Athens, Greece.

3GPP TS 38.211 V0.0.0; 3rd Generation Partnership Project; Technical Specification Group Radio Access Network; NR; Physical channels and modulation(Release 15); 10 pages, May 2017.

Interdigital Inc, "C-DRX for Multiple Numerologies", 3GPP TSG-RAN WG2 #98; R2-1704913, May 15-19, 2017, 4 pages, Hangzhou, China.

3GPP TS 38.331 V0.0.3; 3rd Generation Partnership Project; Technical Specification Group Radio Access Network; NR; Radio Resource Control (RRC); Protocol specification (Release 15 ); 20 pages.

Huawei et al., "Configuration of control resource set", 3GPP TSG RAN WG1 Meeting #89, R1-1706943, May 15-19, 2017, 5 pages, Hangzhou, China.

KT Corp., "Considerations on NR PDCCH structure", 3GPP TSG RAN WG1 Meeting #89, R1-1709145, May 15-19, 2017, 4 pages. Hangzhou, P. R. China.

Huawei et al., "Search space design considerations", 3GPP TSG RAN WG1 Meeting #88bis, R1-1704202, Apr. 3-7, 2017, 5 pages, Spokane, USA.

Huawei et al., "CCE-to-REG Mapping", 3GPP TSG RAN WG1 Meeting #89, R1-1706946, May 15-19, 2017, 8 pages, Hangzhou, China.

* cited by examiner

| Time unit index | Control channel parameter configuration |
|---|---|
| 1 | Control channel parameter configuration A |
| 2 | Control channel parameter configuration A |
| 3 | Control channel parameter configuration B |
| 4 | Control channel parameter configuration B |
| 5 | Control channel parameter configuration B |
| ... | ... |

FIG. 8A

| Control channel parameter configuration | Time unit index |
|---|---|
| Control channel parameter configuration A | {1, 2} |
| Control channel parameter configuration B | {3, ..., 7} |
| ... | ... |

FIG. 8B

SIGNAL TRANSMISSION METHOD, RELATED APPARATUS, AND SYSTEM

CROSS-REFERENCE TO RELATED APPLICATIONS

This application is a continuation of International Application No. PCT/CN2018/091682, filed on Jun. 15, 2018, which claims priority to Chinese Patent Application No. 201710462040.1, filed on Jun. 16, 2017. The disclosures of the aforementioned applications are hereby incorporated by reference in their entireties.

TECHNICAL FIELD

This disclosure relates to the field of wireless communications technologies, and in particular, to a signal transmission method, a related apparatus, and a system.

BACKGROUND

At present, during research on a new radio (NR) communications technology, a control resource set (CORESET) concept is introduced for a control channel resource. A CORESET corresponds to a time-frequency resource. One CORESET corresponds to one group of users. Physical downlink control channels (PDCCHs) of the group of users are sent on the CORESET. In the CORESET, each user has one search space, and a size of a time-frequency resource in the search space is less than or equal to that of a time-frequency resource in the CORESET.

In a future NR communications system, to support a plurality of scenarios such as enhanced mobile broadband (eMBB), massive machine type communications (mMTC), and ultra-reliable and low latency communications (URLLC), different parameters (numerology) may be configured in the system to support different service scenarios. A parameter (numerology) represents an attribute of a time-frequency resource. A group of parameters such as a time-domain scheduling interval, a subcarrier spacing, symbol duration, and a cyclic prefix (CP) length are included.

As shown in FIG. 1A, in a hybrid numerology scenario, CORESETs associated with different numerologies correspond to groups of users with different service attributes. For example, a CORESET associated with a numerology 3 corresponds to a group of URLLC users, and the group of URLLC users send PDCCHs on the CORESET associated with the numerology 3.

To ensure timely transmission of a URLLC service, the URLLC service can preempt a resource associated with another numerology (for example, a resource bearing an eMBB service). As shown in FIG. 1B, when the URLLC service preempts a resource on first several symbols in a resource associated with another numerology, a conflict may occur between the CORESET associated with the numerology 3 and a CORESET associated with the another numerology. Consequently, a user (or some users) may fail to find an available PDCCH resource in a search space to transmit control information corresponding to the URLLC service.

In the prior art, to avoid a conflict between a CORESET associated with URLLC and a CORESET associated with another numerology, as shown in FIG. 2, the CORESET associated with URLLC is always limited within a relatively small frequency domain range, so that on any symbol, there are as few conflicts as possible between the CORESET associated with URLLC and the CORESET associated with the another numerology. Consequently, on each symbol, the CORESET associated with URLLC is fixedly limited within a relatively small frequency domain range. Therefore, this resource configuration method is inflexible.

SUMMARY

This disclosure provides a signal transmission method, a related apparatus, and a system, so that flexible configuration of a control channel parameter can be implemented.

According to a first aspect, this disclosure provides a signal transmission method, which is applied to a network device side. The method includes configuring, by a network device, at least two sets of control channel parameters for a terminal, and then sending first configuration information to the terminal. The first configuration information includes the at least two sets of control channel parameters. Each set of the at least two sets of control channel parameters corresponds to at least one time unit.

According to a second aspect, this disclosure provides a signal transmission method, which is applied to a terminal side. The method includes receiving, by a terminal, first configuration information from a network device, and then determining, based on an index of a time unit and the first configuration information, a control channel parameter corresponding to the time unit represented by the index. The first configuration information may include at least two sets of control channel parameters configured by the network device. Each set of the at least two sets of control channel parameters corresponds to at least one time unit.

In the methods described in the first aspect and the second aspect, the terminal may select, for a time unit (or some time units), a proper control channel parameter from the at least two sets of control channel parameters configured by the network device, so that flexible configuration of the control channel parameter can be implemented.

In this disclosure, control channel parameters respectively corresponding to a plurality of time units determined by the network device may be control channel parameters associated with a specified numerology. In this disclosure, the specified numerology may be referred to as a first numerology. The first numerology may be a numerology that matches a URLLC service, or may be another specified numerology, which is not limited in this disclosure.

On the network device side, the network device determines, based on known resource scheduling conditions in the plurality of time units, the control channel parameters respectively corresponding to the plurality of time units. A resource scheduling situation in one time unit may include in the time unit, whether there is a CORESET associated with another numerology, whether there is a blank resource, or whether there is a resource used by a common channel (such as a synchronization channel (SCH), a broadcast channel (BCH), and an uplink random access channel (UL-RACH)), or the like. Herein, the CORESET associated with the another numerology, the blank resource, the common channel, or the like may be referred to as a first resource. In this way, the network device may determine, based on a resource scheduling situation in each of the plurality of time units, a control channel parameter corresponding to each of the plurality of time units, so that a conflict between a CORESET associated with the first numerology and the first resource in the plurality of time units is avoided as much as possible.

On the terminal side, when there is a service (such as a URLLC service) that matches the first numerology, the terminal may select a proper control channel parameter for one time unit (or some time units) currently bearing the service. It may be understood that because the network device has preconfigured the control channel parameters respectively corresponding to the plurality of time units, the terminal may directly determine, based on the first configuration information sent by the network device, a control channel parameter corresponding to the time unit (or the some time units). In addition, in the time unit (or the some time units), there is no conflict between the CORESET associated with the first numerology and the first resource or a conflict between the CORESET associated with the first numerology and the first resource is smallest.

In this disclosure, the first configuration information may be presented in the following two manners. In a first presentation manner, one time unit index corresponds to one set of control channel parameters. In a second presentation manner, one set of control channel parameters corresponds to a plurality of time unit indexes.

In the first presentation manner, although control channel parameters corresponding to some time units are the same, the first configuration information may indicate a control channel parameter corresponding to each time unit. In other words, the network device may configure a control channel parameter corresponding to each symbol.

In the second presentation manner, the first configuration information may uniformly indicate a control channel parameter corresponding to a plurality of symbols in a same resource scheduling situation, instead of repeatedly indicating a same control channel parameter on the plurality of symbols. Compared with the first presentation manner, signaling overheads may be reduced in the second presentation manner.

The control channel parameter in this disclosure may include at least one of the following:

(1) a resource location of a CORESET;

(2) a mapping manner (continuous or discontinuous mapping) between a CCE and a resource element group (REG) in a CORESET;

(3) a mapping manner (continuous or discontinuous mapping) between a PDCCH candidate and a CCE;

(4) locations of resources used by PDCCH candidates at different aggregation levels (ALs) in a control resource set; and (5) a resource sharing manner (a basic nested manner or a group nested manner) used by PDCCH candidates at different ALs in a control resource set.

It may be understood that the control channel parameter varies with the resource location of the CORESET, the control channel parameter varies with the mapping manner between the CCE and the REG in the CORESET, the control channel parameter varies with the mapping manner between the PDCCH candidate and the CCE in the CORESET, and the control channel parameter varies with the resource sharing manner used by the PDCCH candidates at different ALs in the CORESET. In this disclosure, the control channel parameter may be adjusted to avoid a conflict as much as possible, and a frequency diversity gain may be further improved. For details about a method for determining a control channel parameter in this disclosure, refer to a subsequent embodiment.

With reference to the first aspect or the second aspect, in a first embodiment, the network device may determine, depending on whether a first resource exists in a time unit, a resource location of a CORESET in the time unit. Specific policies are as follows:

1. If no first resource exists in a time unit, a percentage of a frequency domain span of the CORESET in the time unit in full bandwidth may be greater than a first threshold (for example, 80%). In other words, the CORESET may occupy as large bandwidth as possible. A value of the first threshold is not limited in this disclosure, and may be determined based on an actual application requirement.

2. If a first resource exists in a time unit, the CORESET occupies other frequency domain in the time unit than the first resource.

In the first embodiment, the resource location corresponding to the control resource set may include a resource start location and a resource end location that correspond to the control resource set. Optionally, the first configuration information may also include a resource start location corresponding to the control resource set and a frequency domain span and a time domain span that correspond to the control resource set. This disclosure is not limited thereto, and the control channel parameter may further include other information that may be used to indicate the resource location of the control resource set, which is not limited herein.

In the first embodiment, the network device may send the first configuration information by using higher layer signaling (such as Radio Resource Control (RRC) signaling), or may send the first configuration information by using physical layer signaling (such as Downlink Control Information (DCI)). Signaling used for sending the first configuration information is not limited in this embodiment.

With reference to the first aspect or the second aspect, in a second embodiment, the network device may determine, depending on whether a first resource exists in a time unit, a mapping manner between a REG and a CCE in a CORESET in the time unit. Specific policies are as follows:

1. If no first resource exists in a time unit, REGs included in the CCE in the CORESET are de-centrally distributed in the time unit.

2. If a first resource exists in a time unit, REGs included in the CCE in the CORESET are centrally distributed in the time unit.

In the second embodiment, a size of a REG bundle in the CCE may be used to indicate whether the network device configures a control channel parameter corresponding to the first policy or a control channel parameter corresponding to the second policy. It may be understood that, in an NR system, the REGs in the CCE are centrally distributed when the REG bundle includes six REGs. The REGs in the CCE are de-centrally distributed when the REG bundle includes two or three REGs.

In the second embodiment, the mapping manner between the REG and the CCE may include a quantity of REGs included in the REG bundle in the CCE, in other words, a quantity of second resource groups included in one group of second resource groups. This disclosure is not limited thereto, and the first configuration information may further include other information that may be used to indicate the mapping manner between the CCE and the REG, which is not limited herein.

In the second embodiment, the network device may send the first configuration information by using higher layer signaling (such as RRC signaling), or may send the first configuration information by using physical layer signaling (such as DCI). Signaling used for sending the first configuration information is not limited in this embodiment.

With reference to the first aspect or the second aspect, in a third embodiment, the network device may determine, depending on whether a first resource exists in a time unit, a mapping manner between a CCE and a PDCCH in a CORESET in the time unit. Specific policies are as follows:

1. If no first resource exists in a time unit, CCEs included in the PDCCH in the CORESET are de-centrally distributed in the time unit.

2. If a first resource exists in a time unit, CCEs included in the PDCCH in the CORESET are centrally distributed in the time unit.

In a third embodiment, the mapping manner between the CCE and the PDCCH may include indication information used to indicate that a PDCCH candidate corresponds to L first resource groups that are consecutive in frequency domain, or indication information used to indicate that a PDCCH candidate corresponds to L first resource groups that are inconsecutive in frequency domain, where L is a positive integer and represents an AL of the PDCCH candidate. This disclosure is not limited thereto, and the control channel parameter may further include other information that may be used to indicate the mapping manner between the CCE and the PDCCH, which is not limited herein.

In the third embodiment, the network device may send the first configuration information by using higher layer signaling (such as RRC signaling), or may send the first configuration information by using physical layer signaling (such as DCI). Signaling used for sending the first configuration information is not limited in this embodiment.

With reference to the first aspect or the second aspect, in a fourth embodiment, the network device may determine, depending on whether a first resource exists in a time unit, locations of time-frequency resources used by PDCCH candidates at different ALs in a CORESET in the time unit, in other words, determine a resource sharing manner used by the PDCCH candidates at different ALs in the CORESET in the time unit. Specific policies are as follows:

1. If no first resource exists in a time unit, a second resource sharing manner is used by the PDCCH candidates at different ALs in the CORESET in the time unit. In this way, a blocking probability can be reduced.

2. If a first resource exists in a time unit, a first resource sharing manner is used by the PDCCH candidates at different ALs in the CORESET in the time unit. In this way, a channel estimation can be more reusable.

In the fourth embodiment, in the first resource sharing manner, time-frequency resources used by PDCCH candidates at different ALs are overlapped as much as possible. To be specific, locations of time-frequency resources used by all PDCCH candidates at different ALs are some or all of locations of time-frequency resources used by PDCCH candidates at one AL that occupy most resources.

In the fourth embodiment, in the second resource sharing manner, all PDCCH candidates at different ALs are divided into two or more groups. The first resource sharing manner is used for each group.

In the fourth embodiment, the control channel parameter may specifically include an index of a resource (such as a CCE) in the control resource set and PDCCH candidates at one or more ALs that are mapped to the resource. In this way, the terminal may obtain, through analysis based on the index of the resource, locations of resources used by PDCCH candidates at different ALs, and finally determine which resource sharing manner is used by the PDCCH candidates at different ALs. This disclosure is not limited thereto, and the control channel parameter may further include other information that may be used to indicate the resource sharing manner used by the PDCCH candidates at different ALs, which is not limited herein.

Optionally, the control channel parameter may specifically also include indication information of the first resource sharing manner or indication information of the second resource sharing manner. For example, a flag bit for indicating a resource sharing manner is set in the first configuration information. The first resource sharing manner is indicated when the flag bit is "1." The second resource sharing manner is indicated when the flag bit is "0." The foregoing example is merely used to explain this disclosure and shall not be construed as a limitation.

In the fourth embodiment, the network device may send the first configuration information by using higher layer signaling (such as RRC signaling), or may send the first configuration information by using physical layer signaling (such as DCI). Signaling used for sending the first configuration information is not limited in this embodiment.

According to a third aspect, this disclosure provides a network device. The network device may include a plurality of function modules, adapted to correspondingly perform the method provided in the first aspect or the method provided in any one of the possible implementations of the first aspect.

According to a fourth aspect, this disclosure provides a terminal. The terminal may include a plurality of function modules, adapted to correspondingly perform the method provided in the second aspect or the method provided in any one of the possible implementations of the second aspect.

According to a fifth aspect, this disclosure provides a network device, adapted to perform the signal transmission method described in the first aspect. The network device may include a memory, a processor coupled to the memory, and a transceiver. The transceiver is adapted to communicate with another communications device (such as a terminal). The memory is adapted to store code for implementing the signal transmission method described in the first aspect, and the processor is adapted to execute program code stored in the memory, in other words, to perform the method provided in the first aspect or the method provided in any one of the possible implementations of the first aspect.

According to a sixth aspect, this disclosure provides a terminal, adapted to perform the signal transmission method described in the second aspect. The terminal may include a memory, a processor coupled to the memory, and a transceiver. The transceiver is adapted to communicate with another communications device (such as a network device). The memory is adapted to store code for implementing the signal transmission method described in the second aspect, and the processor is adapted to execute program code stored in the memory, in other words, to perform the method provided in the second aspect or the method provided in any one of the possible implementations of the second aspect.

According to a seventh aspect, a communications system is provided. The communications system includes a network device and a terminal.

The network device is adapted to configure at least two sets of control channel parameters for the terminal, and then send first configuration information to the terminal. The first configuration information includes the at least two sets of control channel parameters. Each set of the at least two sets of control channel parameters corresponds to at least one time unit.

The terminal is adapted to receive the first configuration information from the network device, and then determine, based on a time unit index and the first configuration information, a control channel parameter corresponding to the time unit index.

Specifically, the network device may be the network device described in the third aspect or the fifth aspect. The terminal may be the terminal described in the fourth aspect or the sixth aspect.

According to an eighth aspect, a computer-readable storage medium is provided. The readable storage medium stores an instruction. When the instruction is run on a computer, the computer is enabled to perform the signal transmission method described in the first aspect.

According to a ninth aspect, another computer-readable storage medium is provided. The readable storage medium stores an instruction. When the instruction is run on a computer, the computer is enabled to perform the signal transmission method described in the second aspect.

According to a tenth aspect, a computer program product including an instruction is provided. When the computer program product is run on a computer, the computer is enabled to perform the signal transmission method described in the first aspect.

According to an eleventh aspect, another computer program product including an instruction is provided. When the computer program product is run on a computer, the computer is enabled to perform the signal transmission method described in the second aspect.

DESCRIPTION OF DRAWINGS

FIG. 8A and FIG. 8B are schematic diagrams of two methods for indicating control channel parameters according to this disclosure;

Figure 11:
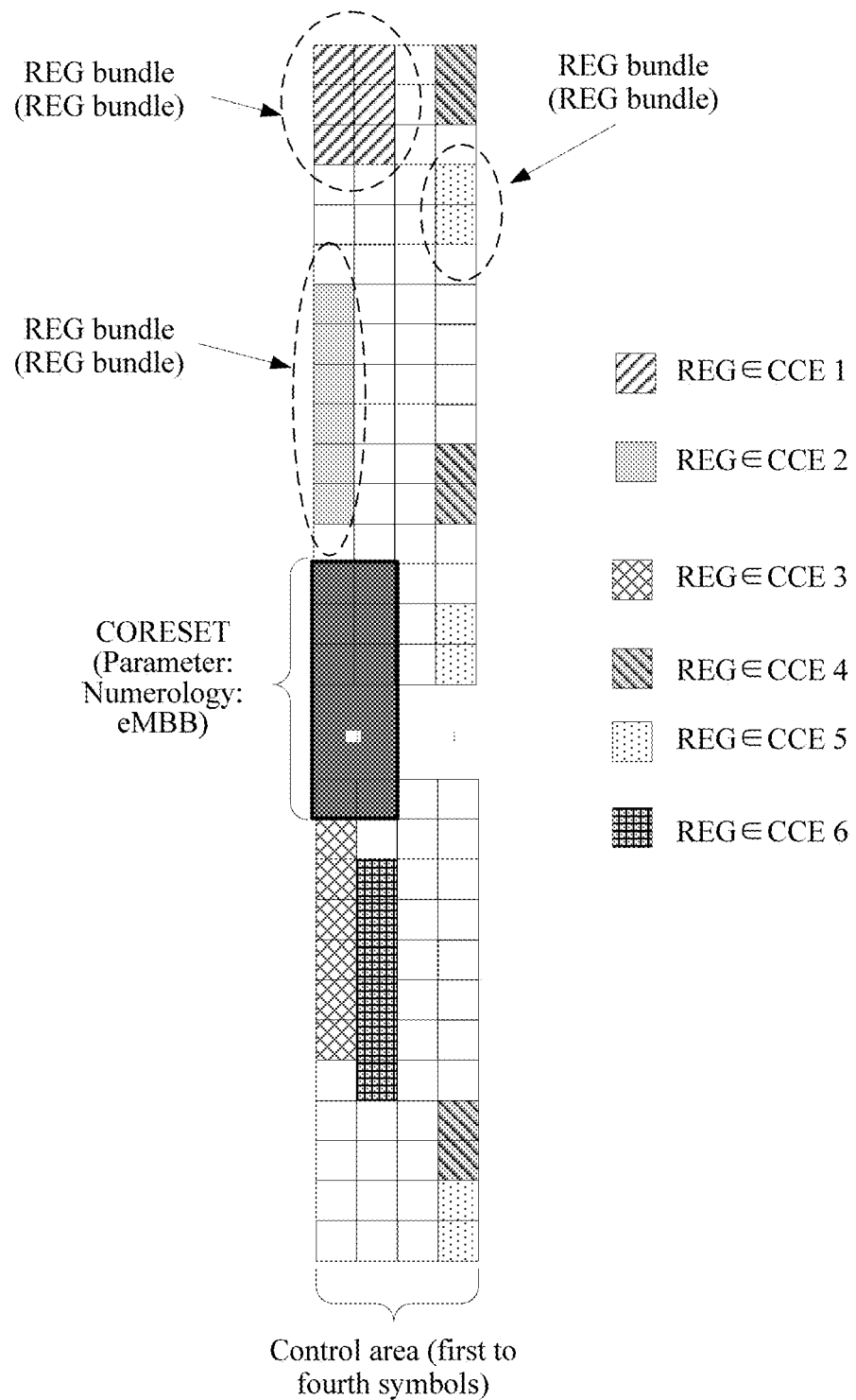
Figure 12A:
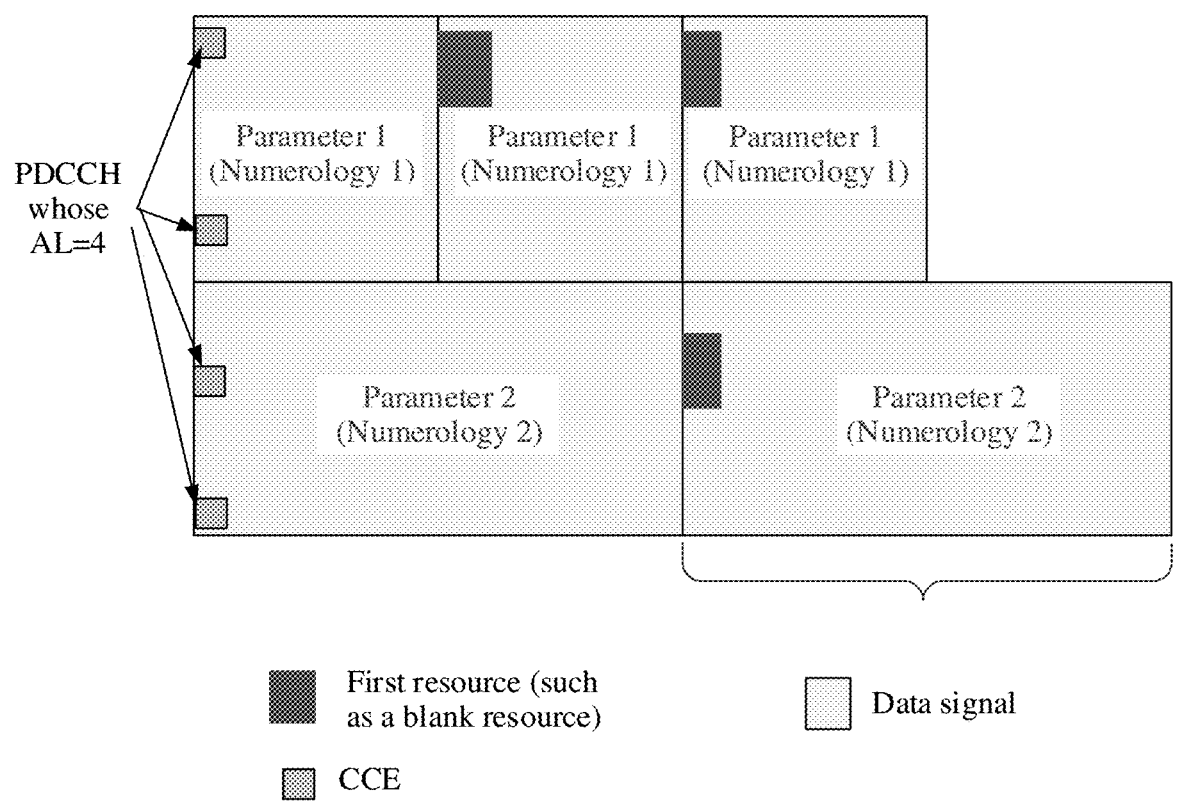
Figure 12B:
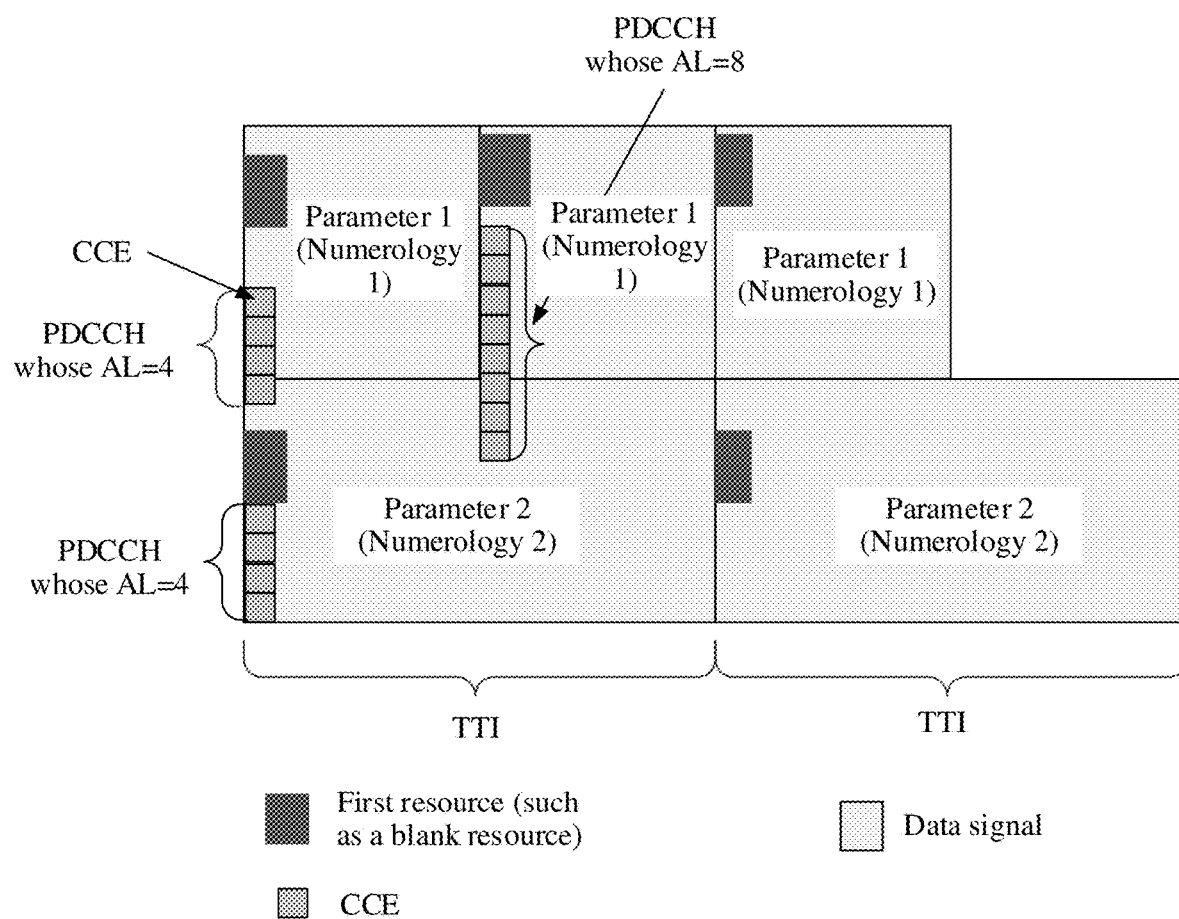
Figure 13A:
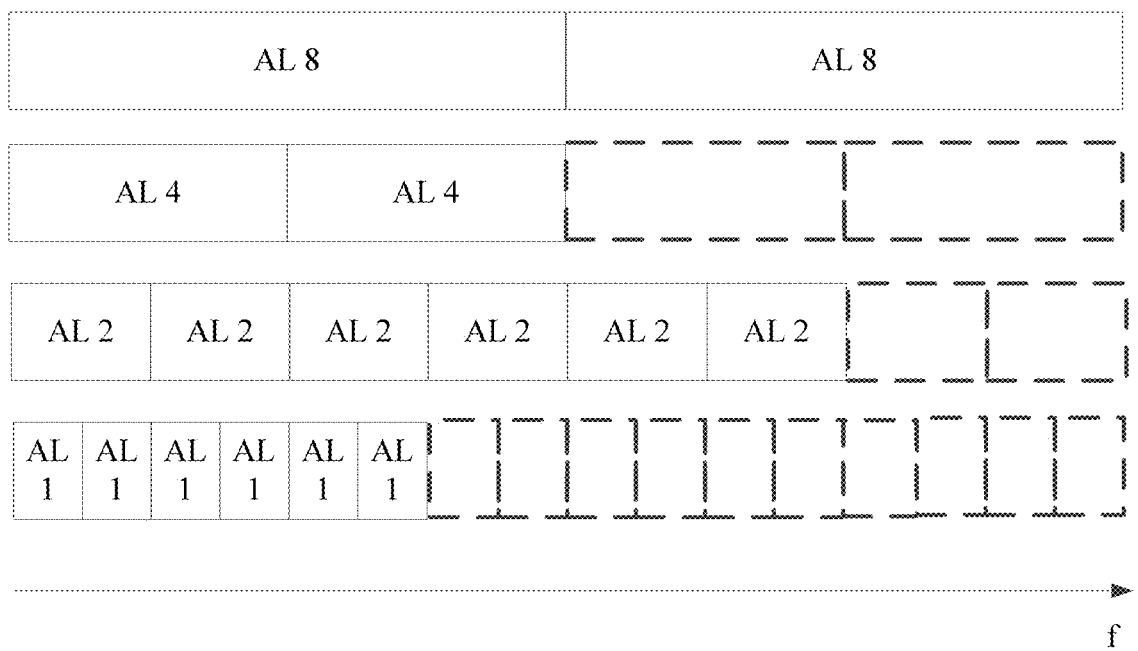
Figure 13B:
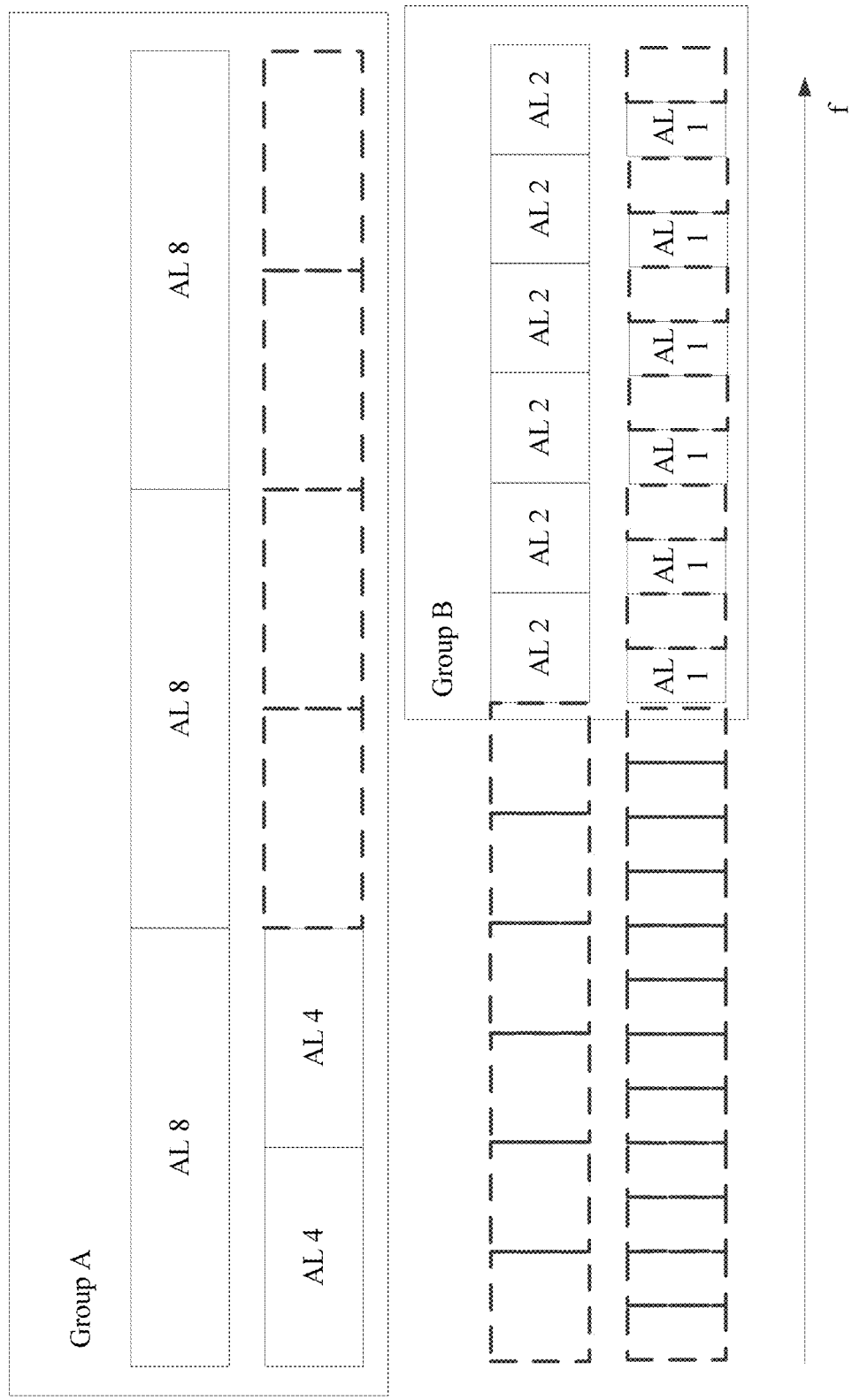
Figure 14A:
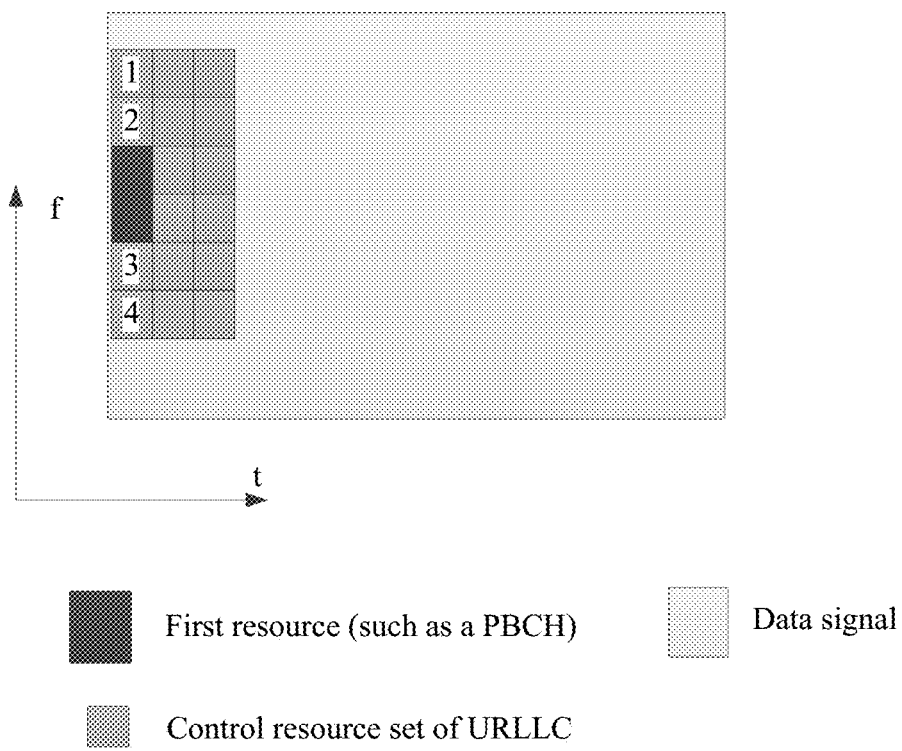
Figure 14B:
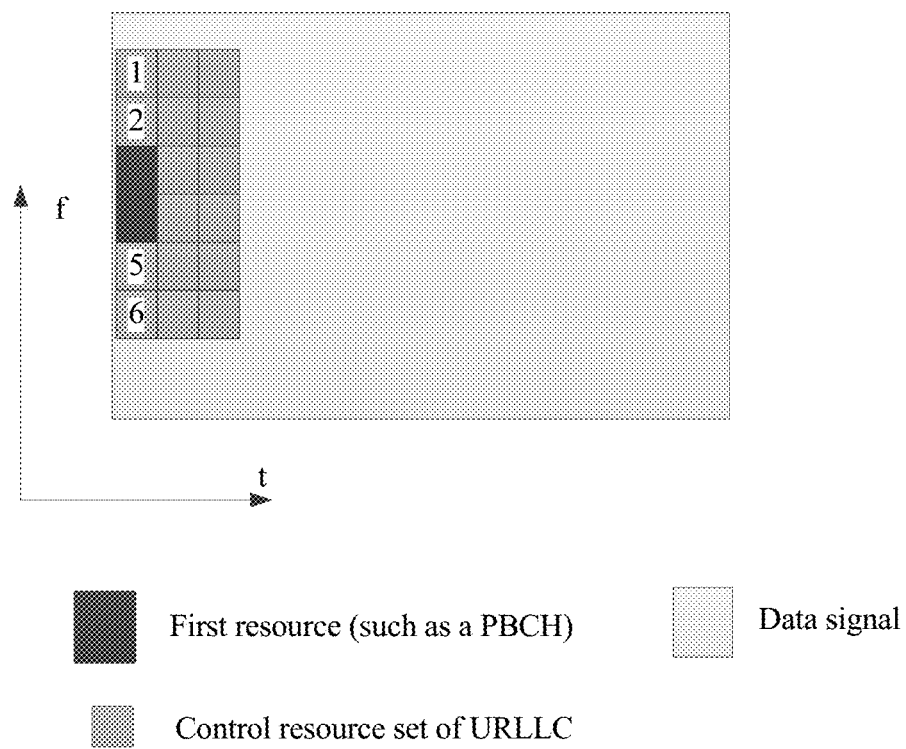
Figure 15:
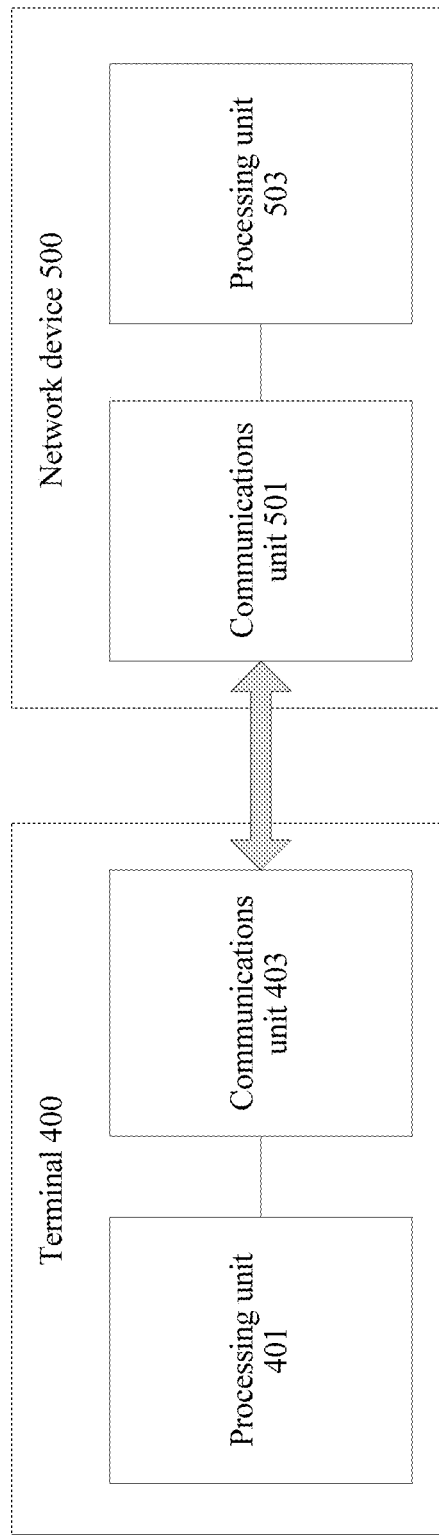

FIG. to is a schematic diagram of a policy for configuring control channel parameters according to another embodiment of this disclosure;

FIG. 11 is a schematic diagram of a policy for configuring control channel parameters according to still another embodiment of this disclosure;

FIG. 12A and FIG. 12B are schematic diagrams of policies for configuring control channel parameters according to yet another embodiment of this disclosure;

FIG. 13A and FIG. 13B are schematic diagrams of policies for configuring control channel parameters according to still yet another embodiment of this disclosure;

FIG. 14A and FIG. 14B are schematic diagrams of policies for configuring control channel parameters according to a further embodiment of this disclosure; and FIG. 15 is a functional block diagram of a wireless communications system, a terminal, and a network device according to this disclosure.

DESCRIPTION OF EXAMPLE EMBODIMENTS

Terms used in implementations of this disclosure are merely used to explain specific embodiments of this disclosure, but are not intended to limit this disclosure.

Figure 1A:
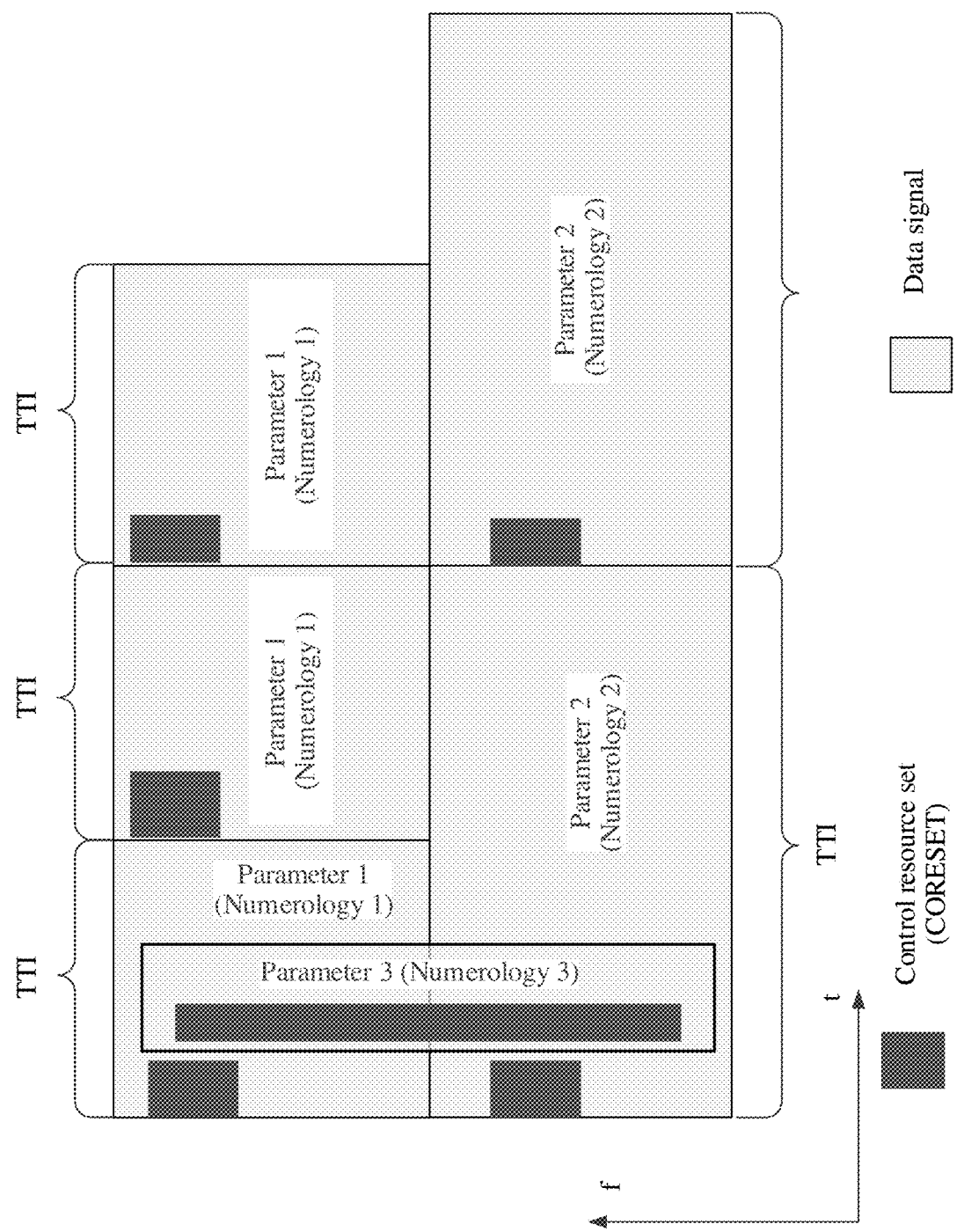
FIG. 1A is a schematic diagram of a resource in a hybrid numerology scenario according to this disclosure.
Figure 1B:
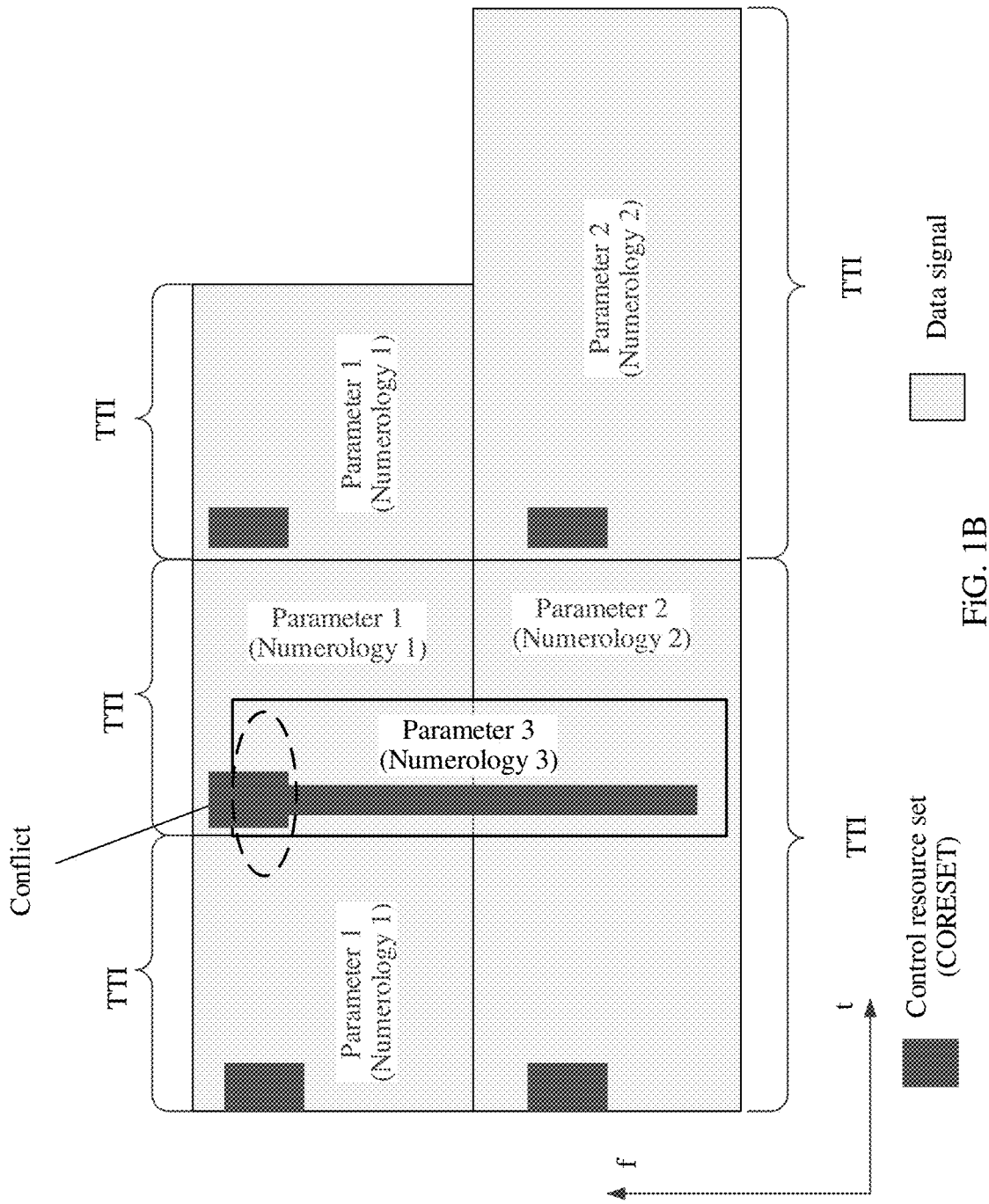
FIG. 1B is a schematic diagram of a resource conflict in a hybrid numerology scenario according to this disclosure.
Figure 2:
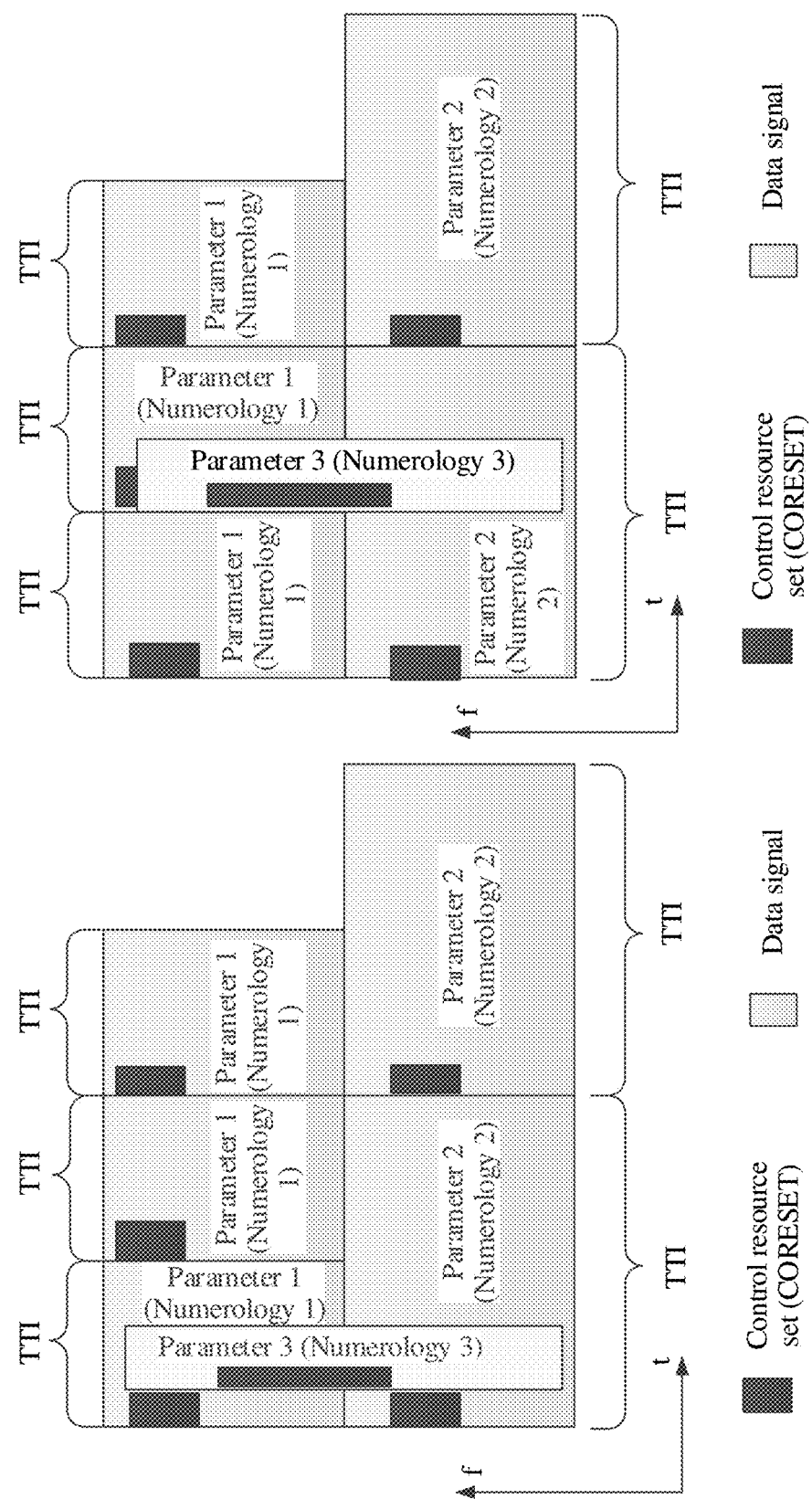
FIG. 2 is a schematic diagram of resource mapping for resolving a resource conflict in a hybrid numerology scenario in the prior art.
Figure 3:
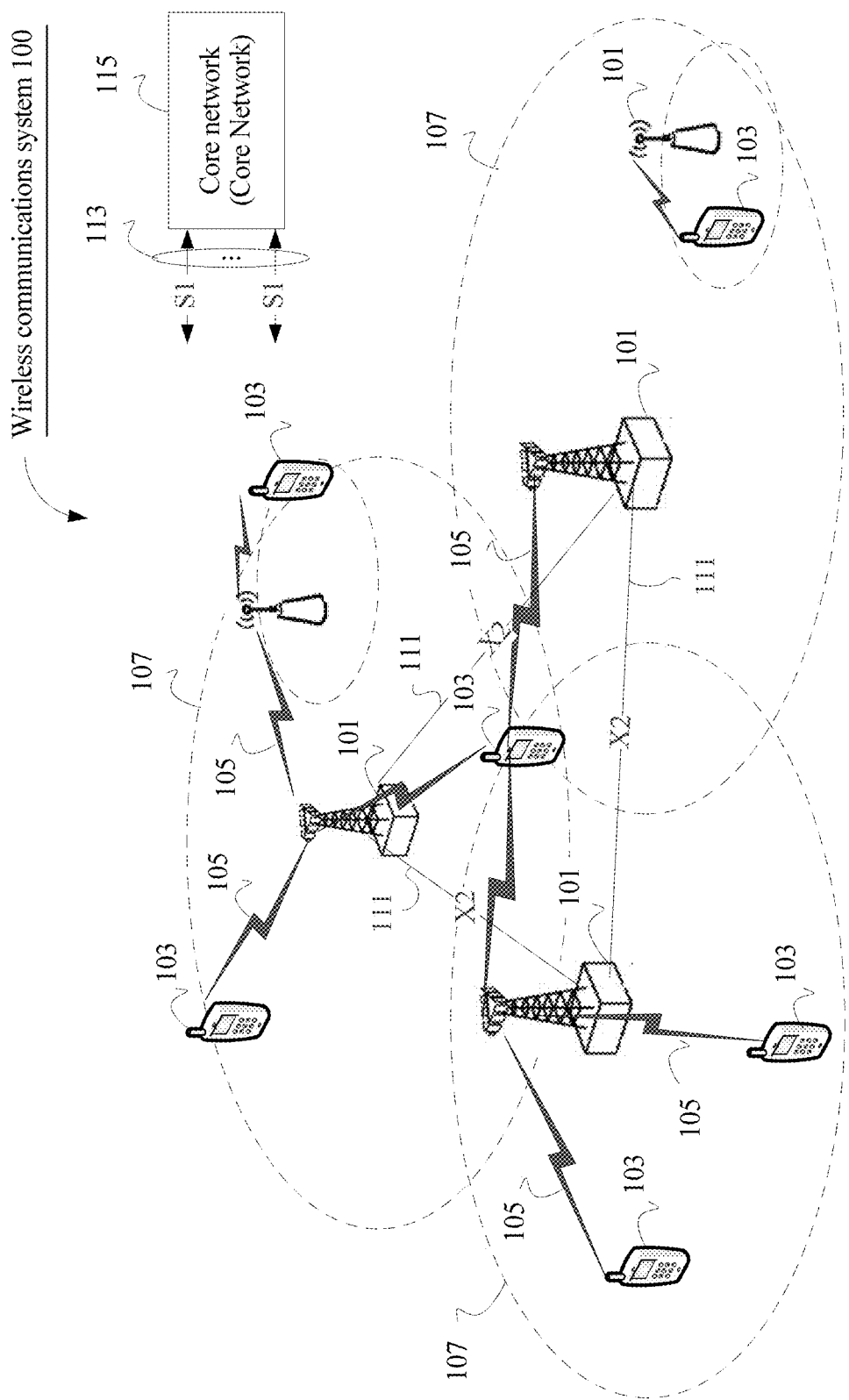
FIG. 3 is a schematic diagram of an architecture of a wireless communications system according to this disclosure.

FIG. 3 shows a wireless communications system according to this disclosure. The wireless communications system may be a long term evolution (LTE) system, or may be a future evolved 5th generation (the 5th Generation, 5G) mobile communications system, an NR system, a machine-to-machine (M2M) communications system, or the like. As shown in FIG. 3, a wireless communications system 100 may include: one or more network devices 101, one or more terminals 103, and a core network 115.

The network device lot may be a base station. The base station may be adapted to communicate with one or more terminals, or may be adapted to communicate with one or more base stations that have some terminal functions (for example, communication between a macro base station and a micro base station, such as an access point). The base station may be a base transceiver station (BTS) in a time division-synchronous code division multiple access (TD-SCDMA) system, or may be an evolved NodeB (eNB) in the LTE system, or a gNB in a 5G system or the NR system. In addition, the base station may alternatively be an access point (AP), a transmission/reception point (TRP), a central unit (CU), or another network entity, and may include some or all of functions of the foregoing network entity.

The terminal 103 may be distributed in the entire wireless communications system 100, may be still, or may be mobile. In some embodiments of this disclosure, the terminal 103 may be a mobile device, a mobile station, a mobile unit, an M2M terminal, a radio unit, a remote unit, a user agent, a mobile client, or the like.

Specifically, the network device lot may be adapted to communicate with the terminal 103 through a wireless interface 105 under control of a network device controller (not shown). In some embodiments, the network device controller may be a part of the core network 115, or may be integrated into the network device 101. Specifically, the network device lot may be adapted to transmit control information or user data to the core network 115 through a backhaul interface 113 (such as an S1 interface). Specifically, the network devices 101 may directly or indirectly communicate with each other through a backhaul interface 111 (such as an X2 interface).

It should be noted that the wireless communications system 100 shown in FIG. 3 is merely intended to more clearly describe the technical solutions in this disclosure, but is not intended to limit this disclosure. A person of ordinary skill in the art may know that as a network architecture evolves and a new service scenario emerges, the technical solutions provided in this disclosure are also applicable to a similar technical problem.

Figure 4:
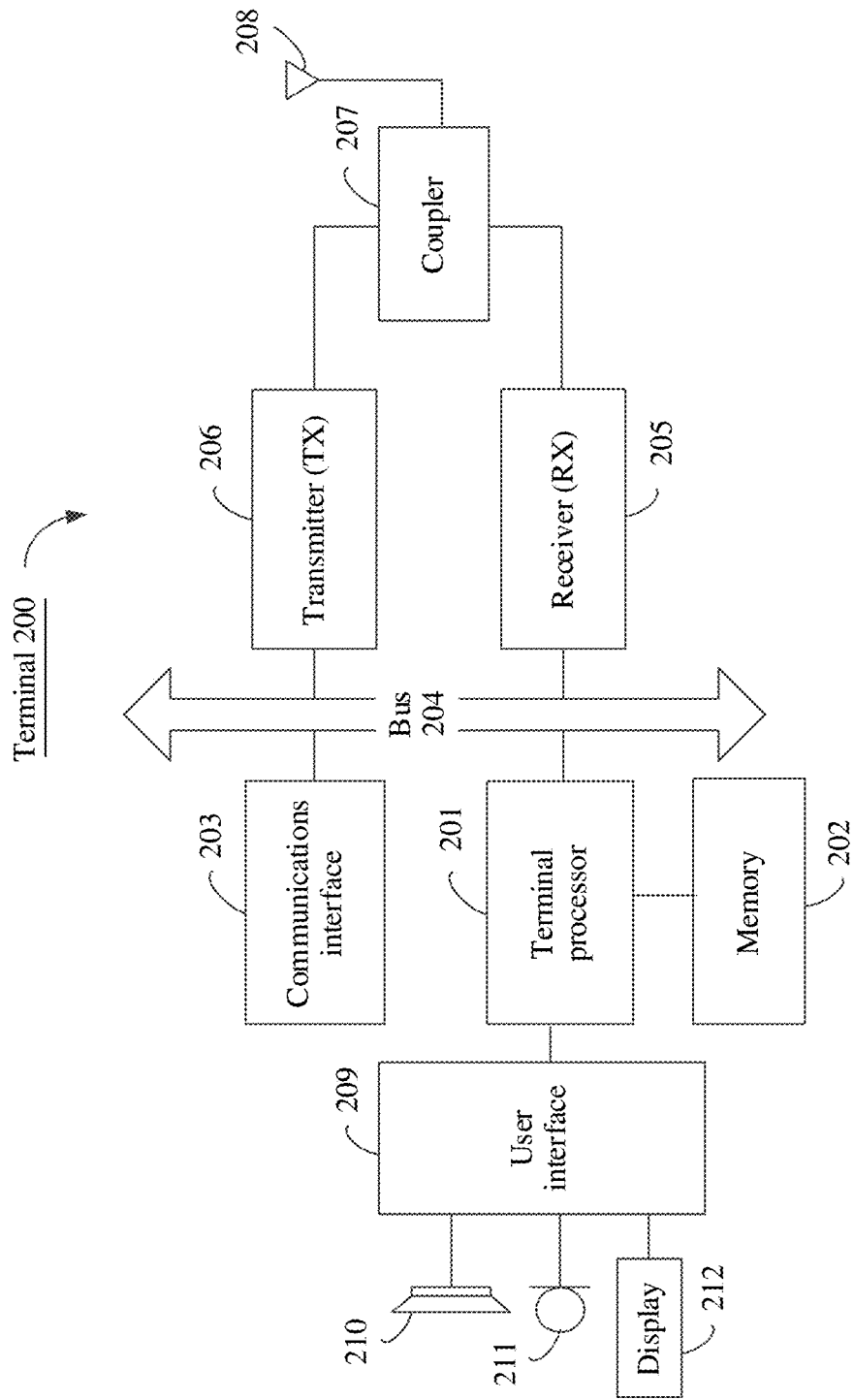
FIG. 4 is a schematic diagram of a hardware architecture of a terminal according to an embodiment of this disclosure.

FIG. 4 shows a terminal 200 according to some embodiments of this disclosure. As shown in FIG. 4, the terminal 200 may include one or more terminal processors 201, a memory 202, a communications interface 203, a receiver 205, a transmitter 206, a coupler 207, an antenna 208, a user interface 209, and an input/output module (including an audio input/output module 210, a key input module 211, a display 212, and the like). These components may be connected by using a bus 204 or in another manner. In FIG. 4, for example, the components are connected by using the bus.

The communications interface 203 may be used for communication between the terminal 200 and another communications device, for example, a network device. Specifically, the network device may be a network device 300 shown in FIG. 5. Specifically, the communications interface 203 may be a communications interface of LTE (4G), or may be a communications interface of 5G or future NR. The terminal 200 is not limited to a wireless communications interface, and may be provided with a wired communications interface 203, for example, a local access network (LAN) interface.

The transmitter 206 may be adapted to process a signal for transmitting that is output by the terminal processor 201, for example, to perform signal modulation. The receiver 205 may be adapted to process a mobile communications signal for receiving that is received by the antenna 208, for example, to perform signal demodulation. In some embodiments of this disclosure, the transmitter 206 and the receiver 205 may be considered as one wireless modem. There may be one or more transmitters 206 and receivers 205 in the terminal 200. The antenna 208 may be adapted to convert electromagnetic energy in a transmission line into an electromagnetic wave in free space, or convert an electromagnetic wave in free space into electromagnetic energy in a transmission line. The coupler 207 is adapted to divide the mobile communications signal received by the antenna 208 into a plurality of signals and allocate the plurality of signals to a plurality of receivers 205.

In addition to the transmitter 206 and the receiver 205 shown in FIG. 4, the terminal 200 may include another communications component, for example, a Global Positioning System (GPS) module, a Bluetooth module, or a wireless fidelity (Wi-Fi) module. The terminal 200 is not limited to the foregoing described wireless communications signal, and may support another wireless communications signal, for example, a satellite signal or a short wave signal. The terminal 200 is not limited to wireless communication, and may be provided with a wired network interface (such as a LAN interface) to support wired communication.

The input/output module may be adapted to perform interaction between the terminal 200 and a user/an external environment, and may mainly include the audio input/output module 210, the key input module 211, the display 212, and the like. Specifically, the input/output module may further include a camera, a touchscreen, a sensor, and the like. All the input/output modules communicate with the terminal processor 201 through the user interface 209.

The memory 202 is coupled to the terminal processor 201, and is adapted to store various software programs and/or a plurality of sets of instructions. Specifically, the memory 202 may include a high-speed random access memory, and may include a non-volatile memory, for example, one or more disk storage devices, flash memory devices, or other non-volatile solid-state storage devices. The memory 202 may store an operating system (briefly referred to as a system in the following), for example, an embedded operating system such as ANDROID, IOS, WINDOWS, or LINUX. The memory 202 may further store a network communication program. The network communication program may be used to communicate with one or more additional devices, one or more terminal devices, and one or more network devices. The memory 202 may further store a user interface program. The user interface program may vividly display content of an application program through a graphical operation interface, and receive, by using an input control such as a menu, a dialog box, and a button, a control operation performed by a user on the application program.

In some embodiments of this disclosure, the memory 202 may be adapted to store a program for implementing, on the terminal 200 side, a signal transmission method provided in one or more embodiments of this disclosure. For implementation of the signal transmission method provided in one or more embodiments of this disclosure, refer to subsequent embodiments.

The terminal processor 201 may be adapted to read and execute a computer-readable instruction. Specifically, the terminal processor 201 may be adapted to invoke a program stored in the memory 202, for example, the program for implementing, on the terminal 200 side, the signal transmission method provided in one or more embodiments of this disclosure, and execute an instruction included in the program.

It may be understood that the terminal 200 may be the terminal 103 in the wireless communications system 100 shown in FIG. 3, and may be implemented as a mobile device, a mobile station, a mobile unit, a radio unit, a remote unit, a user agent, a mobile client, or the like.

It should be noted that the terminal 200 shown in FIG. 4 is merely an implementation of the embodiments of this disclosure. In actual application, the terminal 200 may also include more or fewer components, and this is not limited herein.

Figure 5:
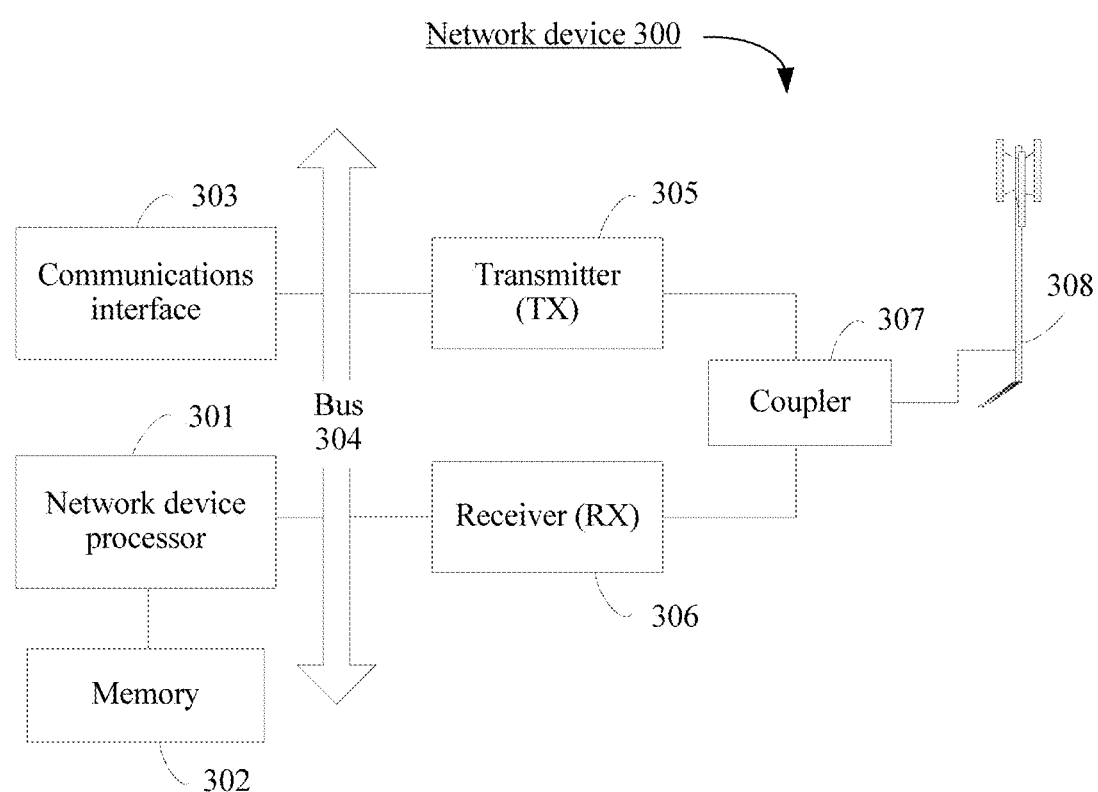
FIG. 5 is a schematic diagram of a hardware architecture of a base station according to an embodiment of this disclosure.

FIG. 5 shows a network device 300 according to some embodiments of this disclosure. As shown in FIG. 5, the network device 300 may include one or more network device processors 301, a memory 302, a communications interface 303, a transmitter 305, a receiver 306, a coupler 307, and an antenna 308. These components may be connected by using a bus 304 or in another manner. In FIG. 5, for example, the components are connected by using the bus.

The communications interface 303 may be used for communication between the network device 300 and another communications device, for example, a terminal device or another network device. Specifically, the terminal device may be the terminal 200 shown in FIG. 4. Specifically, the communications interface 303 may be a communications interface of LTE (4G), or may be a communications interface of 5G or future NR. The network device 300 is not limited to a wireless communications interface, and may be provided with a wired communications interface 303 to support wired communication. For example, a backhaul connection between a network device 300 and another network device 300 may be a wired communication connection.

The transmitter 305 may be adapted to process a signal for transmitting that is output by the network device processor 301, for example, to perform signal modulation. The receiver 306 may be adapted to process a mobile communications signal for receiving that is received by the antenna 308, for example, to perform signal demodulation. In some embodiments of this disclosure, the transmitter 305 and the receiver 306 may be considered as one wireless modem. There may be one or more transmitters 305 and receivers 306 in the network device 300. The antenna 308 may be adapted to convert electromagnetic energy in a transmission line into an electromagnetic wave in free space, or convert an electromagnetic wave in free space into electromagnetic energy in a transmission line. The coupler 307 may be adapted to divide the mobile communications signal into a plurality of signals and allocate the plurality of signals to a plurality of receivers 306.

The memory 302 is coupled to the network device processor 301, and is adapted to store various software programs and/or a plurality of sets of instructions. Specifically, the memory 302 may include a high-speed random access memory, and may include a non-volatile memory, for example, one or more disk storage devices, flash memory devices, or other non-volatile solid-state storage devices. The memory 302 may store an operating system (briefly referred to as a system in the following), for example, an embedded operating system such as uCOS, VxWorks, or RTLinux. The memory 302 may further store a network communication program. The network communication program may be used to communicate with one or more additional devices, one or more terminal devices, and one or more network devices.

The network device processor 301 may be adapted to manage a radio channel, establish and disconnect a call and communication link, provide cell handover control for a user in a local control area, and the like. Specifically, the network device processor 301 may include an administration module/ communication module (AM/CM) (a center for speech channel switching and information exchanging), a basic module (BM) (adapted to complete call processing, signaling processing, radio resource management, radio link management, and circuit maintenance functions), a transcoder and submultiplexer (TCSM) (adapted to complete multiplexing/demultiplexing and transcoding functions), and the like.

In this embodiment of this disclosure, the network device processor 301 may be adapted to read and execute a computer-readable instruction. Specifically, the network device processor 301 may be adapted to invoke a program stored in the memory 302, for example, a program for implementing, on the network device 300 side, the signal transmission method provided in one or more embodiments of this disclosure, and execute an instruction included in the program.

It may be understood that the network device 300 may be a base station 101 in the wireless communications system 100 shown in FIG. 3, and may be implemented as a base transceiver station, a wireless transceiver, a basic service set (BSS), an extended service set (ESS), a NodeB, an eNodeB, an access point, a TRP, or the like.

It should be noted that the network device 300 shown in FIG. 5 is merely an implementation of the embodiments of this disclosure. In actual application, the network device 300 may also include more or fewer components, and this is not limited herein.

Based on the embodiments corresponding to the wireless communications system 100, the terminal 200, and the network device 300, an embodiment of this disclosure provides a signal transmission method. Details are described below.

To help understand this disclosure, the following first describes basic concepts in this disclosure.

(I) AL of a PDCCH

The AL refers to a quantity of control channel elements (CCEs) used for bearing one PDCCH. The CCE is a basic unit of a control channel physical resource. One CCE includes a plurality of resource element groups (REG). In an LTE system, one CCE includes nine REGs, and in an NR system, one CCE includes six REGs. One REG includes a plurality of resource elements (RE). In the LTE system, one REG includes four REs. In the NR system, one REG includes one resource block (RB) in one OFDM symbol. An RE includes one subcarrier in one OFDM symbol, and is a smallest physical time-frequency resource in the LTE system and the NR system. In this disclosure, unless otherwise specified, a symbol and a time domain symbol are equivalent to each other and interchangeable. An OFDM symbol is an example of a time domain symbol, but a time domain symbol is not limited to an OFDM symbol.

In the LTE system, common ALs are 1, 2, 4, and 8. In the NR system, ALs 16 and 32 may also be used.

A network side determines an AL of a PDCCH based on factors such as a size of a DCI payload and quality of a radio channel. A larger DCI payload leads to a higher AL of a corresponding PDCCH. When the quality of the radio channel is worse, a higher AL of the PDCCH is required to ensure PDCCH transmission quality.

(II) Search space of a control channel

For a terminal, a quantity of CCEs of each PDCCH changes and is not notified to the terminal through signaling, and therefore, the terminal has to perform blind detection on PDCCH candidates at all possible ALs. To reduce a quantity of times of performing blind detection and reduce complexity of blind detection for the terminal, a system may predefine an AL set. For example, an AL set $\{1, 2, 4, 8\}$ may be defined, to be specific, a network side may send a PDCCH by using one, two, four, or eight CCEs. Correspondingly, the terminal needs to separately perform blind detection on PDCCHs whose ALs are 1, 2, 4, and 8.

To further reduce the quantity of times of performing blind detection and reduce the complexity of blind detection for the terminal, the system defines a series of possible PDCCH locations in a control resource area for each AL, and these locations are referred to as PDCCH candidates. A PDCCH candidate set that needs to be monitored by the terminal is referred to as a search space. A PDCCH candidate set corresponding to one AL is referred to as a search space at the AL.

(III) CORESET

Figure 6:
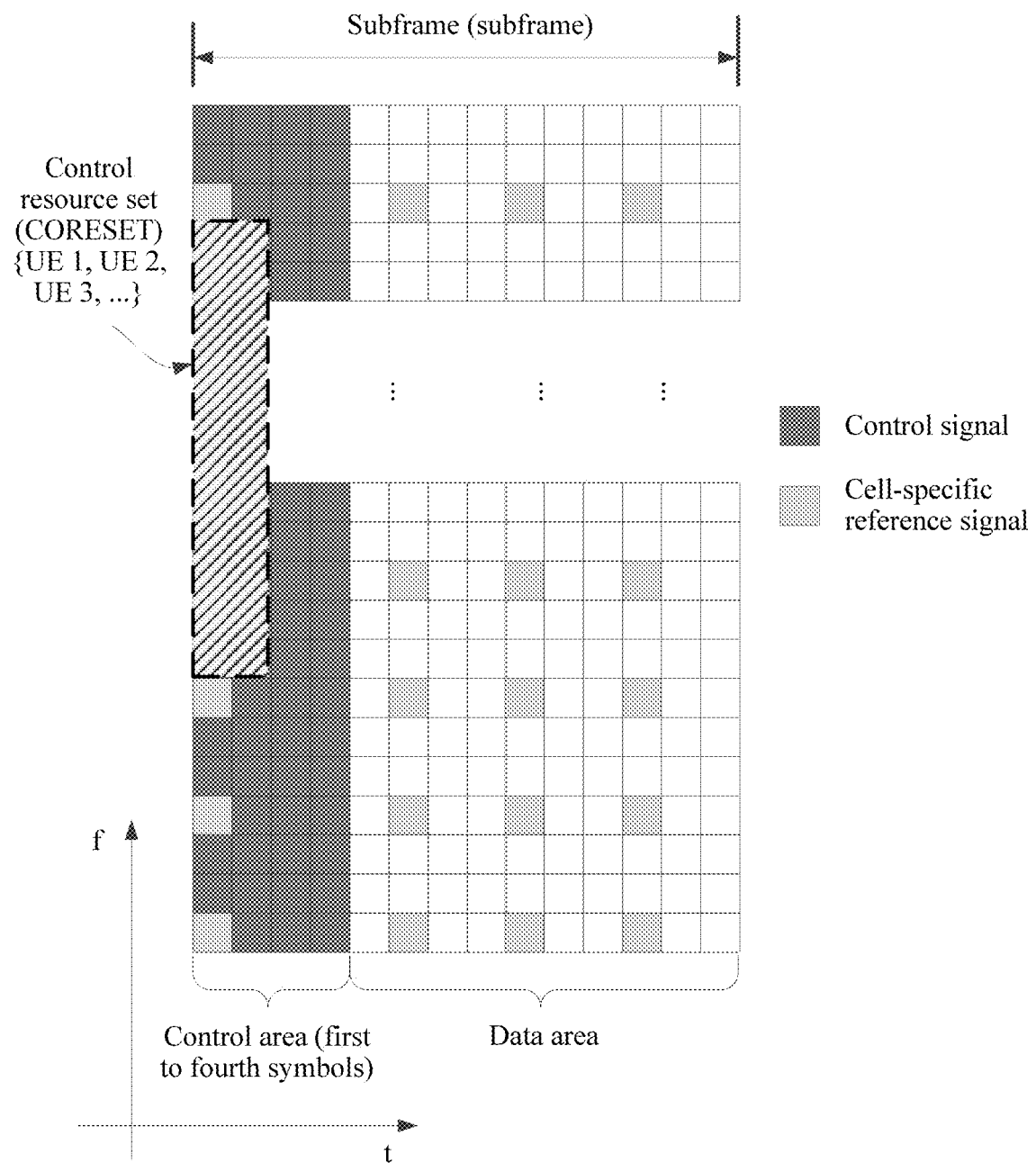
FIG. 6 is a schematic diagram of a control resource set according to this disclosure.

FIG. 6 shows a CORESET as an example according to this disclosure. As shown in FIG. 6, one CORESET is one time-frequency resource. One CORESET corresponds to one group of users (such as UE 1, UE 2, and UE 3). PDCCH of the group of users are sent on the CORESET. In one CORESET, each user has one search space, and a size of a resource in the search space is less than or equal to that of a resource in the CORESET. One user may correspond to a plurality of CORESETs associated with different numerologies, such as a CORESET of URLLC and a CORESET of eMBB. In FIG. 6, first four of 14 time domain symbols are used as a control area, and only some resources in the first four time domain symbols may be defined as resources corresponding to one CORESET.

Figure 7A:
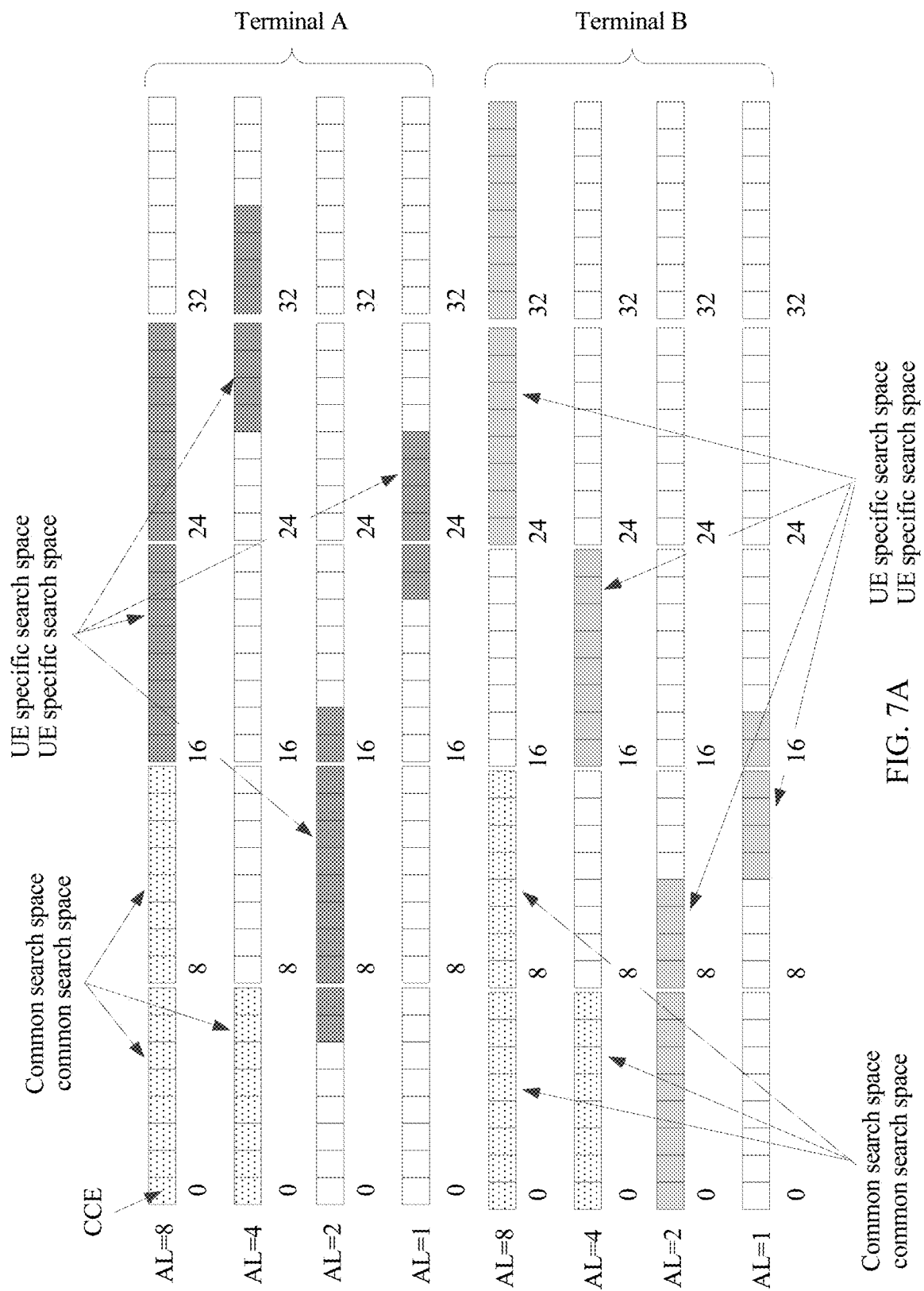
FIG. 7A and FIG. 7B are schematic diagrams of mapping relationships between search spaces, PDCCH candidates, control channel elements, and resource element groups according to this disclosure.
Figure 7B:
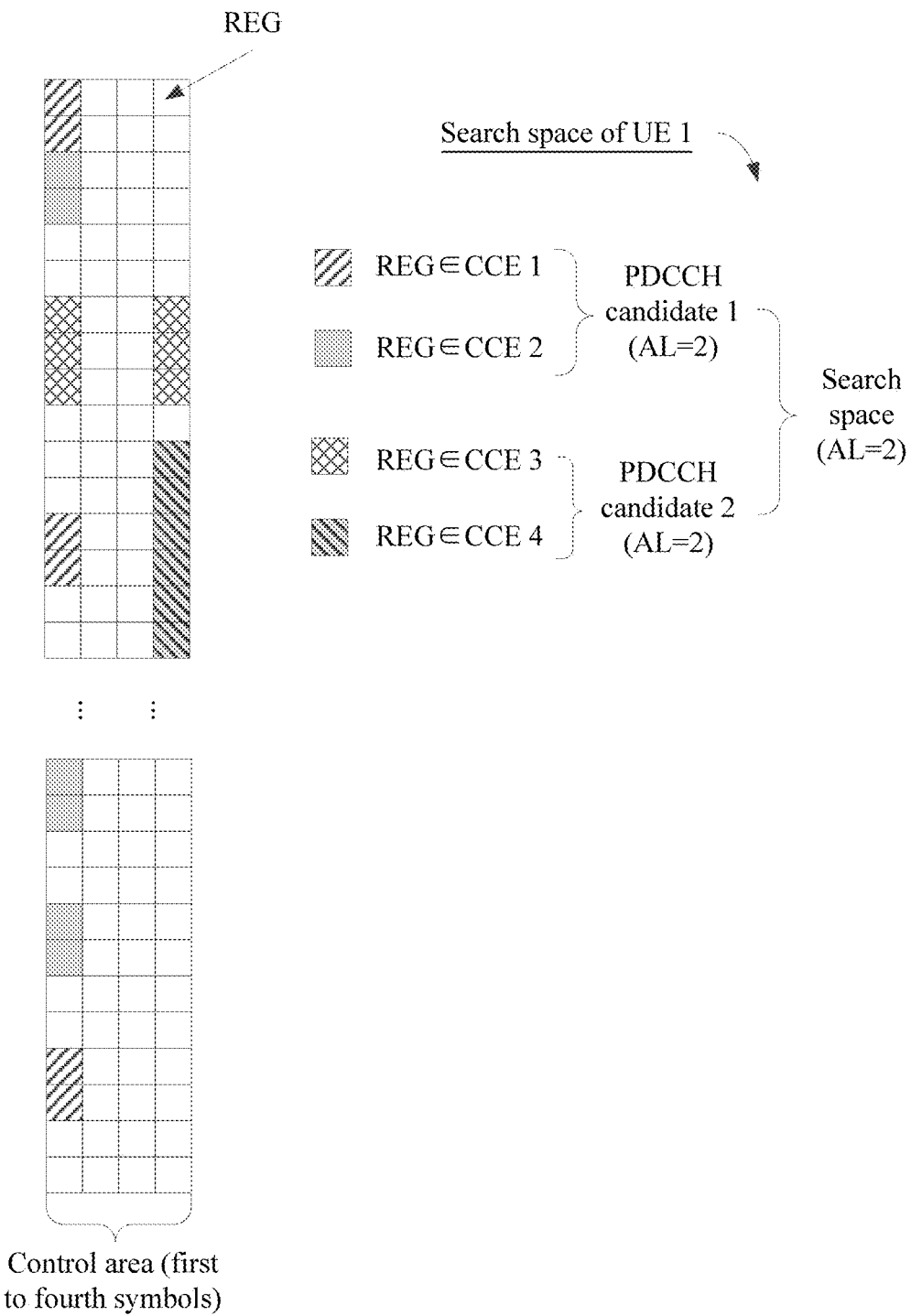

FIG. 7A and FIG. 7B describe mapping relationships between REGs, CCEs, PDCCH candidates, and search spaces as an example. Details are as follows:

FIG. 7A shows a logical mapping relationship between a search space and a PDCCH candidate as an example. As shown in FIG. 7A, one user has search spaces at a plurality of different ALs. A terminal A in FIG. 7A is used as an example. The terminal A has search spaces at four different ALs. A search space whose AL is 8 (AL=8) includes two PDCCH candidates whose ALs are 8 (AL=8). A search space whose AL is 4 (AL=4) includes two PDCCH candidates whose ALs are 4 (AL=4). A search space whose AL is 2 (AL=2) includes six PDCCH candidates whose ALs are 2 (AL=2). A search space whose AL is 1 (AL=1) includes six PDCCH candidates whose ALs are 1 (AL=1).

FIG. 7A also shows a logical mapping relationship between a PDCCH candidate and a CCE as an example. CCEs in the control area are all numbered by the system.

Numbers of the CCEs are logical numbers and are used to uniquely determine physical resource locations of the CCEs. That numbers of CCEs on a PDCCH candidate are consecutive does not represent that the CCEs on the PDCCH candidate are consecutive on a physical resource. For a mapping relationship between a CCE, a PDCCH, and a search space on the physical resource, refer to FIG. 7B.

FIG. 7B shows CCE distribution on a physical resource as an example. As shown in FIG. 7B, when a CCE is mapped to a physical resource, REGs in the CCE may be de-centralized or centralized. For example, REGs in a CCE 1, a CCE 2, and a CCE 3 are de-centralized, and REGs in a CCE 4 are centralized. In other words, a physical resource location uniquely indicated by one CCE number may be consecutive and centralized resource locations, or may be a series of de-centralized resource locations.

FIG. 7B also shows a mapping relationship between a CCE and a PDCCH candidate on a physical resource as an example. As shown in FIG. 7B, a physical resource location of one PDCCH candidate includes a location set of CCEs on the PDCCH candidate that are mapped onto a physical resource. CCEs on one PDCCH candidate may be de-centrally or centrally distributed on the physical resource. For example, as shown in FIG. 7B, the CCE 1 and the CCE 2 on a PDCCH candidate 1 are both de-centrally distributed on the physical resource, the CCE 3 on a PDCCH candidate 2 is de-centrally distributed on the physical resource, and the CCE 4 on the PDCCH candidate 2 is centrally distributed on the physical resource. The foregoing example is merely used to explain this disclosure and shall not be construed as a limitation.

FIG. 7B further shows a mapping relationship between a search space and a PDCCH candidate on a physical resource as an example. As shown in FIG. 7B, a physical resource location set of PDCCH candidates on one search space includes a physical resource location of the search space. For example, as shown in FIG. 7B, a physical resource location of a search space of UE 1 includes a physical resource location of the PDCCH candidate 1 and a physical resource location of the PDCCH candidate 2. The foregoing example is merely used to explain this disclosure and shall not be construed as a limitation.

In this disclosure, the CCE may be referred to as a first resource group, the REG may be referred to as a second resource group, and a REG bundle may be referred to as a third resource group. The first resource group includes at least one second resource group. The first resource group includes at least one third resource group. The third resource group includes at least one second resource group.

In this disclosure, a time unit may be one of a time domain symbol, a mini-slot, a slot, a subframe, or a frame.

It should be noted that, for resource concepts such as the REG, the CCE, the PDCCH, and the search space in this disclosure, refer to existing definitions (for example, regulations provided in an LTE standard and an NR communications system), but the resource concepts are not limited to the existing definitions. Definitions of these resource concepts in a future communications standard may be different, and this does not affect implementation of this disclosure.

Second, a principle of this disclosure may include that a network device determines control channel parameters respectively corresponding to a plurality of time units, and sends, to a terminal, indication information used to indicate at least two sets of control channel parameters configured by the network device for the terminal, where each set of control channel parameters corresponds to at least one time unit. Correspondingly, the terminal may determine, based on the indication information and a time unit index (or some time unit indexes), a control channel parameter corresponding to the time unit (or the some time units). In this disclosure, the indication information may be referred to as first configuration information. In this way, the terminal may select a proper control channel parameter for a time unit (or some time units), so that flexible configuration of the control channel parameter can be implemented.

Herein, the control channel parameters respectively corresponding to the plurality of time units determined by the network device may be control channel parameters associated with a specified numerology. In this disclosure, the specified numerology may be referred to as a first numerology. The first numerology may be a numerology that matches a URLLC service, or may be another specified numerology, which is not limited in this disclosure.

For the network device, resource scheduling situations in the plurality of time units are known. A resource scheduling situation in one time unit may include: in the time unit, whether there is a CORESET associated with another numerology, whether there is a blank resource, or whether there is a resource used by a common channel (such as an SCH, a BCH, and a UL-RACH), or the like. Herein, the CORESET associated with the another numerology, the blank resource, the common channel, or the like may be referred to as a first resource. In this way, the network device may determine, based on a resource scheduling situation in each of the plurality of time units, a control channel parameter corresponding to each of the plurality of time units, so that a conflict between a CORESET associated with the first numerology and the first resource in the plurality of time units is avoided as much as possible.

Herein, the blank resource may include but is not limited to the following resources: 1. resources that need to be avoided by NR and that are used by some common channels (such as an SCH, a BCH, and a UL-RACH), a pilot signal, and the like that are in LTE when NR coexists with LTE; and 2. resources reserved for future expansion. In summary, NR may configure some time-frequency resources as blank resources.

On a terminal side, when there is a service (such as a URLLC service) that matches the first numerology, the terminal may select a proper control channel parameter for one time unit (or some time units) currently bearing the service. It may be understood that because the network device has preconfigured the control channel parameters respectively corresponding to the plurality of time units, the terminal may directly determine, based on the first configuration information sent by the network device, a control channel parameter corresponding to the time unit (or the some time units). In addition, in the time unit (or the some time units), there is no conflict between the CORESET associated with the first numerology and the first resource or a conflict between the CORESET associated with the first numerology and the first resource is smallest.

In this disclosure, the first configuration information may be presented in the following two manners. In a first presentation manner, one time unit index corresponds to one set of control channel parameters. In a second presentation manner, one set of control channel parameters corresponds to a plurality of time unit indexes.

In the first presentation manner, as shown in FIG. 8A, although control channel parameters corresponding to some time units are the same, the first configuration information may indicate a control channel parameter corresponding to each time unit. Each time unit herein is reflected in the foregoing correspondence as one time unit index of the time unit in a larger time span. For example, one time domain symbol is used as the time unit. The network device may configure a control channel parameter corresponding to each time domain symbol. A corresponding time unit index may be an index of the time domain symbol in a mini-slot, or an index in a slot, or an index in a subframe, or an index in a radio frame.

In the second presentation manner, as shown in FIG. 8B, the first configuration information may uniformly indicate a control channel parameter corresponding to a plurality of symbols in a same resource scheduling situation, instead of repeatedly indicating a same control channel parameter on the plurality of symbols. Compared with the first presentation manner, signaling overheads may be reduced in the second presentation manner.

The control channel parameter in this disclosure may include at least one of the following:

(1) a resource location of a CORESET;
(2) a mapping manner (continuous or discontinuous mapping) between a CCE and an REG in a CORESET;
(3) a mapping manner (continuous or discontinuous mapping) between a PDCCH candidate and a CCE;
(4) locations of resources used by PDCCH candidates at different ALs in a control resource set; and
(5) a resource sharing manner (a basic nested manner or a group nested manner) used by PDCCH candidates at different ALs in a control resource set.

It may be understood that the control channel parameter varies with the resource location of the CORESET, the control channel parameter varies with the mapping manner between the CCE and the REG in the CORESET, the control channel parameter varies with the mapping manner between the PDCCH candidate and the CCE in the CORESET, and the control channel parameter varies with the resource sharing manner used by the PDCCH candidates at different ALs in the CORESET. In this disclosure, the control channel parameter may be adjusted to avoid a conflict as much as possible, and a frequency diversity gain may be further improved. For details about a method for determining a control channel parameter in this disclosure, refer to a subsequent embodiment.

Based on the foregoing principles, the following describes in detail a method for configuring control channel parameters provided in this disclosure by using several embodiments. The following Embodiment 1 to Embodiment 4 may be combined for implementation.

(I) Embodiment 1

In this embodiment, a network device may determine, depending on whether a first resource exists in a time unit, a resource location of a CORESET in the time unit. In this embodiment, different control channel parameters refer to different resource locations of the CORESET. Specific policies are as follows:

1. If no first resource exists in a time unit, a percentage of a frequency domain span of the CORESET in the time unit in full bandwidth may be greater than a first threshold (for example, 80%), in other words, the CORESET may occupy as large bandwidth as possible. A value of the first threshold is not limited in this disclosure, and may be determined based on an actual application requirement.

2. If a first resource exists in a time unit, the CORESET occupies other frequency domain in the time unit than the first resource.

Figure 9A:
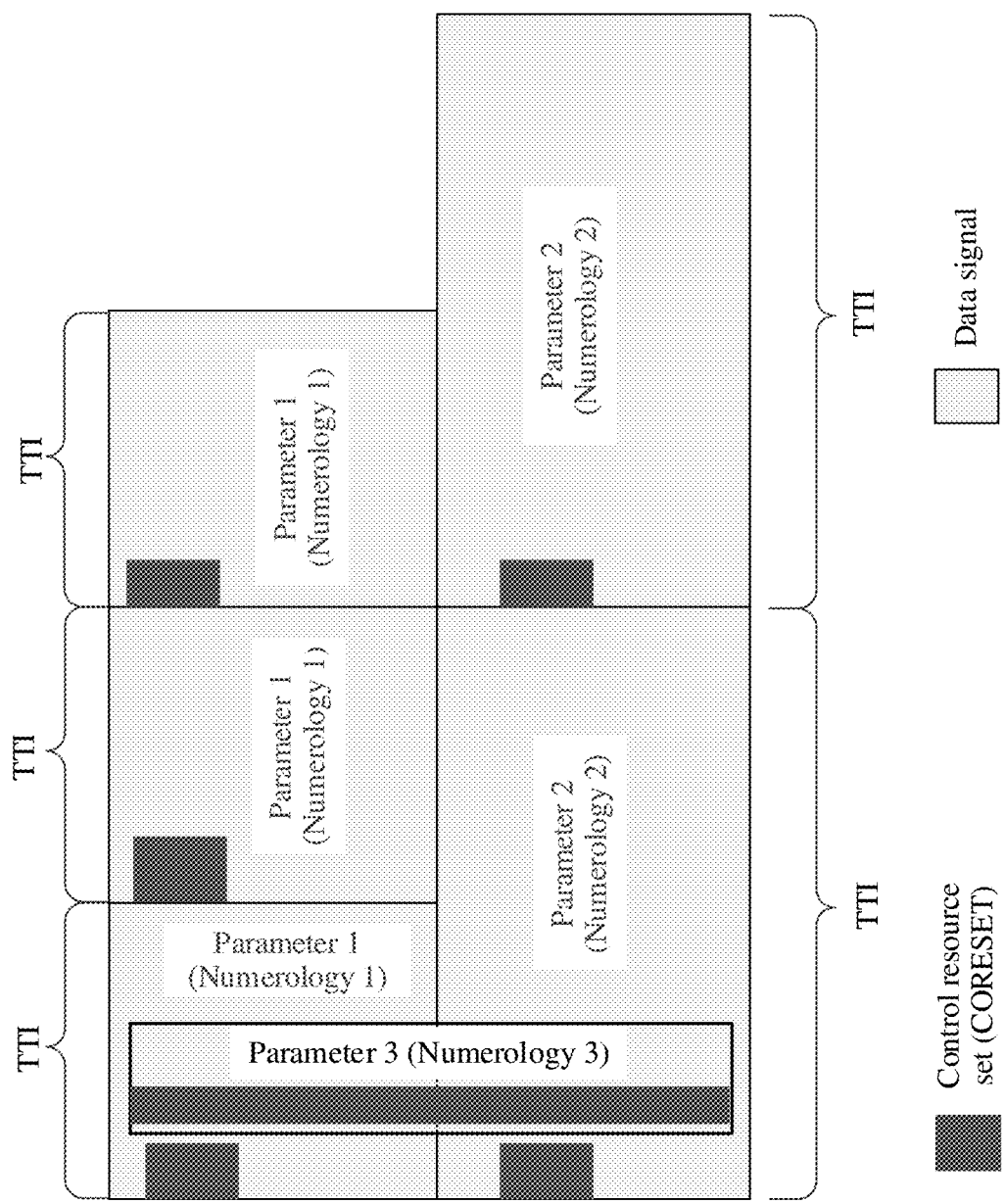
FIG. 9A to FIG. 9C are schematic diagrams of policies for configuring control channel parameters according to an embodiment of this disclosure.
Figure 9B:
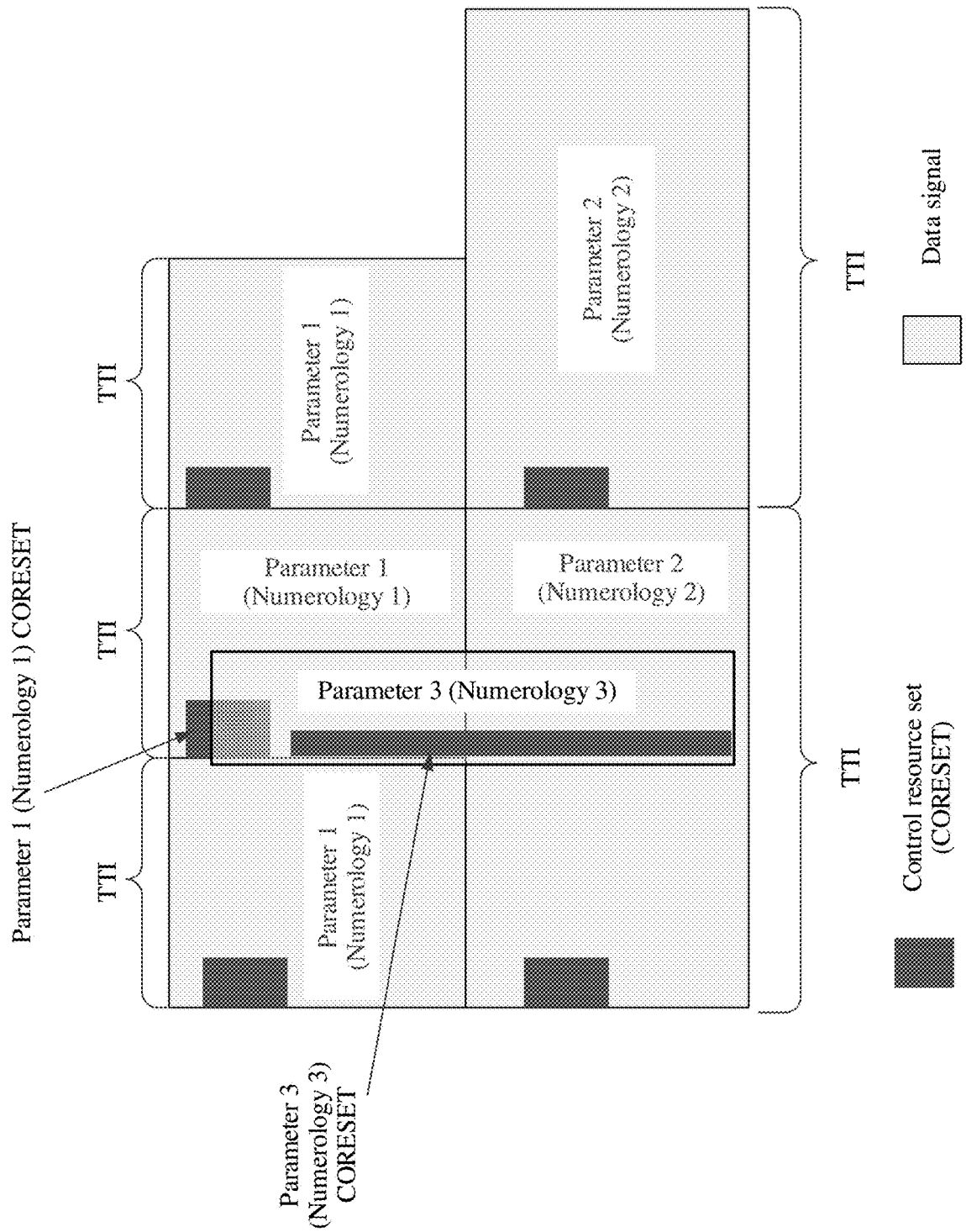
Figure 9C:
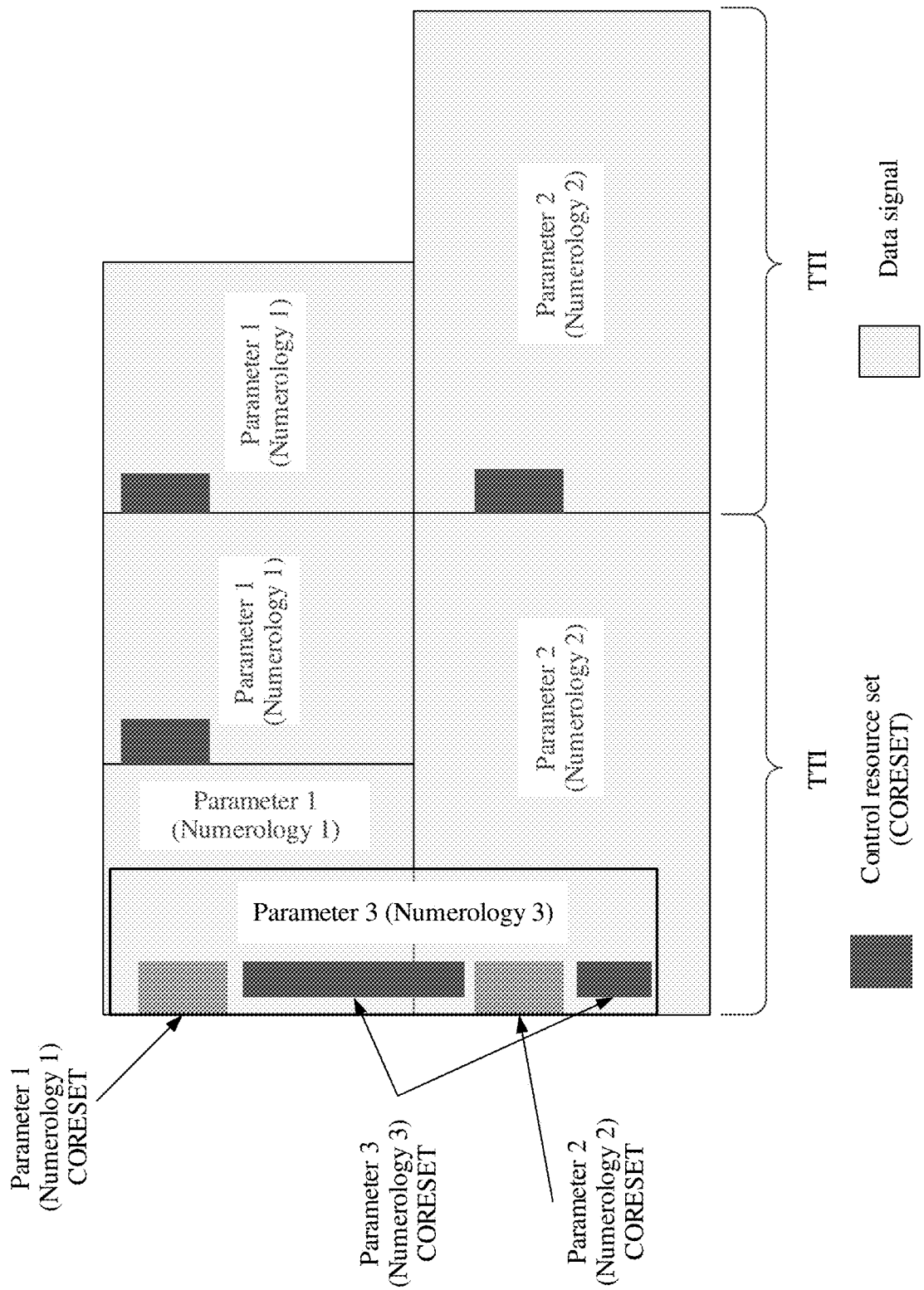
Figure 10:
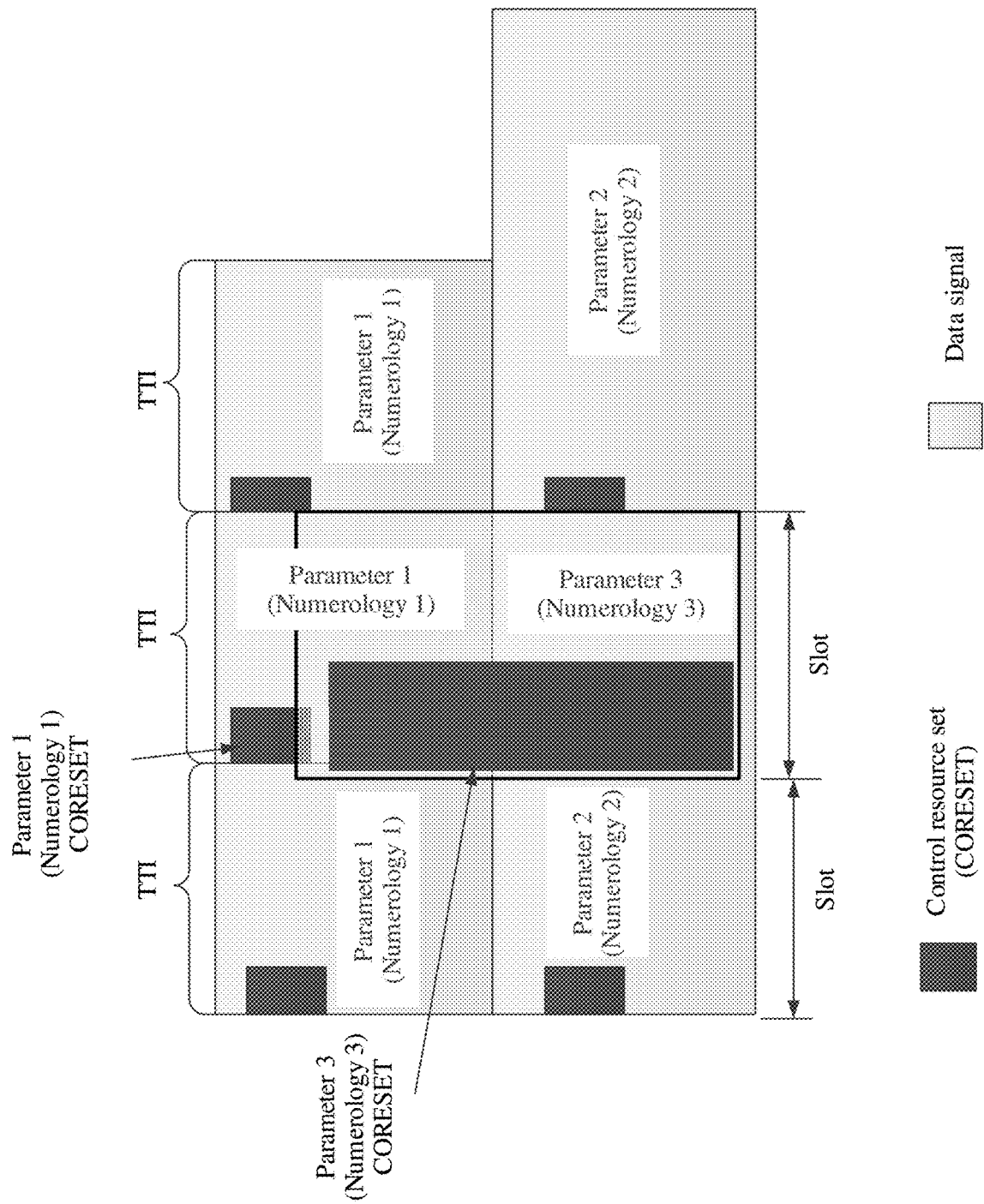

Configuring a CORESET associated with a numerology 3 (namely, the foregoing first numerology) is used as an example. FIG. 9A to FIG. 9C describe the foregoing two policies as an example. It is assumed that both a CORESET associated with a numerology 1 and a CORESET associated with a numerology 2 belong to the first resource.

As shown in FIG. 9A, if no first resource (no CORESET associated with the numerology 1 or the numerology 2) exists in the time unit, the CORESET associated with the numerology 3 may occupy as large bandwidth as possible in the time unit, or may even occupy the full bandwidth.

As shown in FIG. 9B, if one first resource (the CORESET associated with the numerology 1) exists in the time unit, the CORESET associated with the numerology 3 may be distributed, in frequency domain, on one side of the first resource or on two sides of the first resource without overlapping the first resource.

As shown in FIG. 9C, if at least two first resources (the CORESET associated with the numerology 1 and the CORESET associated with the numerology 2) exist in the time unit, the CORESET associated with the numerology 3 may be de-centrally distributed, in frequency domain, between the at least two first resources without overlapping the at least two first resources.

The foregoing two policies describe how to adjust a frequency domain location of the CORESET, this disclosure is not limited thereto, and a time domain location of the CORESET may be further adjusted. It may be understood that when the time unit is a relatively large time interval such as a subframe (or a frame), a mini-slot, or a slot, adjusting the resource location of the CORESET may further include adjusting the time domain location of the CORESET. When the time unit is a symbol, there is no need to consider adjusting the time domain location of the CORESET.

As shown in FIG. to, it is assumed that the time unit is a slot. If a first resource (the CORESET associated with the numerology 1) exists in a slot, in addition to configuring a location, in frequency domain, of the CORESET associated with the numerology 3 according to the foregoing second policy (referring to FIG. 9B or FIG. 9C), a location, in time domain, of the CORESET associated with the numerology 3 may be further configured. Optionally, the CORESET associated with the numerology 3 may occupy some or all of symbols in the slot.

In Embodiment 1, first configuration information may include a resource start location and a resource end location that correspond to the control resource set. Optionally, the first configuration information may also include a resource start location corresponding to the control resource set and a frequency domain span and a time domain span that correspond to the control resource set. This disclosure is not limited thereto, and the control channel parameter may further include other information that may be used to indicate the resource location of the control resource set, which is not limited herein.

In Embodiment 1, the network device may send the first configuration information by using higher layer signaling (such as RRC signaling), or may send the first configuration information by using physical layer signaling (such as DCI). Signaling used for sending the first configuration information is not limited in this embodiment.

It may be understood that, in Embodiment 1, the network device determines, depending on whether the first resource exists in the time unit, the resource location of the control resource set in the time unit, so that on the symbol, there is no conflict between the control resource set and the first resource, thereby reducing a PDCCH blocking probability.

(II) Embodiment 2

First, it should be learned that REGs may be grouped into a REG bundle, and one REG bundle may include at least two REGs, for example, one REG bundle may include two or three or six REGs. A REG bundle is consecutive on a time-frequency resource, but REG bundles included in a CCE are not necessarily consecutive on the time-frequency resource. In an NR system, one CCE includes six REGs. It may be understood that when one REG bundle includes six REGs, one CCE includes only one REG bundle, and the REG bundle is consecutive on the time-frequency resource. Therefore, whether REGs included in the CCE are consecutive may be reflected by a size (two or three or six REGs) of the REG bundle.

In this embodiment, a network device may determine, depending on whether a first resource exists in a time unit, a mapping manner between a REG and a CCE in a CORESET in the time unit. In this embodiment, different control channel parameters refer to different mapping manners between the REG and the CCE in the CORESET. In the different control channel parameters, resource locations of the CORESET may be the same or different. Specific policies are as follows:

1. If no first resource exists in a time unit, REGs included in the CCE in the CORESET are de-centrally distributed in the time unit.

2. If a first resource exists in a time unit, REGs included in the CCE in the CORESET are centrally distributed in the time unit.

It is assumed that a control resource set of eMBB belongs to the first resource, and the time unit is a symbol. Configuring a control resource set of URLLC is used as an example, and the two policies in Embodiment 2 are described with reference to FIG. 11.

As shown in FIG. 11, no control resource set of eMBB exists on a third symbol and a fourth symbol, and therefore, the REGs included in the CCE are de-centrally distributed on the third symbol and the fourth symbol. A REG bundle in the CCE includes two or three REGs. In this way, more frequency diversity gains can be obtained.

As shown in FIG. 11, a control resource set of eMBB exists on a first symbol and a second symbol, and therefore, the REGs included in the CCE are centrally distributed on the first symbol and the second symbol. A REG bundle in the CCE includes six REGs. In this way, a conflict between the REGs included in the CCE and the control resource set of eMBB can be avoided as much as possible.

Herein, the REGs included in the CCE may be presented in two centralized distribution manners: 1. As shown in a CCE 2 in FIG. 11, the REGs included in the CCE are consecutively and centrally distributed in frequency domain. 2. As shown in a CCE 1 in FIG. 11, the REGs included in the CCE are located in a same frequency domain location, and are consecutively and centrally distributed in time domain.

In Embodiment 2, a size of a REG bundle in the CCE may be used to indicate whether the network device configures a control channel parameter corresponding to the first policy or a control channel parameter corresponding to the second policy. It may be understood that, in the NR system, the REGs in the CCE are centrally distributed when the REG bundle includes six REGs. The REGs in the CCE are de-centrally distributed when the REG bundle includes two or three REGs.

In Embodiment 2, first configuration information may include a quantity of REGs included in the REG bundle in the CCE, in other words, a quantity of second resource groups included in one group of second resource groups. This disclosure is not limited thereto, and the first configuration information may further include other information that may be used to indicate the mapping manner between the CCE and the REG, which is not limited herein.

In Embodiment 2, the network device may send the first configuration information by using higher layer signaling (such as RRC signaling), or may send the first configuration information by using physical layer signaling (such as DCI). Signaling used for sending the first configuration information is not limited in this embodiment.

It may be understood that, in Embodiment 2, the network device determines, depending on whether the first resource exists in the time unit, the mapping manner between the CCE and the REG in the control resource set, so that a conflict between the control resource set and the first resource is avoided as much as possible, and a frequency diversity gain for a PDCCH may also be improved.

(III) Embodiment 3

In this embodiment, a network device may determine, depending on whether a first resource exists in a time unit, a mapping manner between a CCE and a PDCCH in a CORESET in the time unit. In this embodiment, different control channel parameters refer to different mapping manners between the CCE and the PDCCH in the CORESET. In the different control channel parameters, resource locations of the CORESET may be the same or different. Specific policies are as follows:

1. If no first resource exists in a time unit, CCEs included in the PDCCH in the CORESET are de-centrally distributed in the time unit.

2. If a first resource exists in a time unit, CCEs included in the PDCCH in the CORESET are centrally distributed in the time unit.

The two policies in Embodiment 3 are described with reference to FIG. 12A and FIG. 12B.

As shown in FIG. 12A, if no first resource (for example, no blank resource) exists in the time unit, CCEs included in a PDCCH whose AL is 4 (AL=4) are de-centrally distributed in frequency domain in the time unit. In this way, more frequency diversity gains can be obtained.

As shown in FIG. 12B, if a first resource (for example, a blank resource) exists in the time unit, CCEs included in a PDCCH whose AL is 4 (AL=4) or 8 (AL=8) are centrally distributed in frequency domain in the time unit. In this way, a conflict between the CCEs included in the PDCCH and the first resource may be avoided as much as possible.

In Embodiment 3, first configuration information may include indication information used to indicate that a PDCCH candidate corresponds to L first resource groups that are consecutive in frequency domain, or indication information used to indicate that a PDCCH candidate corresponds to L first resource groups that are inconsecutive in frequency domain, where L is a positive integer and represents an AL of the PDCCH candidate. This disclosure is not limited thereto, and the control channel parameter may further include other information that may be used to indicate the mapping manner between the CCE and the PDCCH, which is not limited herein.

In Embodiment 3, the network device may send the first configuration information by using higher layer signaling (such as RRC signaling), or may send the first configuration information by using physical layer signaling (such as DCI). Signaling used for sending the first configuration information is not limited in this embodiment.

It may be understood that, in Embodiment 3, the network device determines, depending on whether the first resource exists in the time unit, the mapping manner between the CCE and the PDCCH in the control resource set, so that a conflict between the control resource set and the first resource is avoided as much as possible, and a frequency diversity gain may also be improved.

In addition, it should be understood that, if the mapping manner between the REG and the CCE determined in Embodiment 2 is discontinuous mapping (the mapping manner used in the first policy in Embodiment 2), the mapping manner between the CCE and the PDCCH may also be discontinuous mapping without implementing Embodiment 3, because basic units CCEs included in the PDCCH are de-centrally mapped on a physical resource.

(IV) Embodiment 4

It should be first learned that, in NR, to reuse a channel estimation, a nested structure may be used when a plurality of PDCCH candidates in a search space of a same user are mapped to a physical resource. In other words, to reuse the channel estimation, PDCCH candidates at different ALs share resources in a nested manner. On shared resources, the channel estimation needs to be performed only once, and there is no need to repeatedly perform the channel estimation. In addition, a total search space corresponding to a plurality of ALs may become smaller.

FIG. 13A and FIG. 13B respectively show two nested resource sharing manners as an example. Description is separately provided below.

In a first resource sharing manner, time-frequency resources used by PDCCH candidates at different ALs are overlapped as much as possible. To be specific, locations of time-frequency resources used by all PDCCH candidates at different ALs are locations of time-frequency resources used by PDCCH candidates at one AL that occupy most resources.

As shown in FIG. 13A, two PDCCH candidates whose ALs are 8 (AL=8) occupy most time-frequency resources, a total of 16 CCEs. In FIG. 13A, locations of time-frequency resources used by all PDCCH candidates at different ALs are locations of the time-frequency resources occupied by the two PDCCH candidates whose ALs are 8 (AL=8). In FIG. 13A, all the PDCCH candidates at different ALs include the two PDCCH candidates whose ALs are 8 (AL=8), two PDCCH candidates whose ALs are 4 (AL=4), six PDCCH candidates whose ALs are 2 (AL=2), and six PDCCH candidates whose ALs are 1 (AL=1).

In a second resource sharing manner, all PDCCH candidates at different ALs are divided into two or more groups. The first resource sharing manner is used for each group.

As shown in FIG. 13B, all PDCCH candidates at different ALs are divided into two groups, a group A and a group B. The group A includes PDCCH candidates whose AL=8 and AL=4, and the group B includes PDCCH candidates whose AL=2 and AL=1. In the group A, locations of time-frequency resources used by the PDCCH candidates whose AL=8 and AL=4 are locations of time-frequency resources used by PDCCH candidates whose AL=8. In the group B, locations of time-frequency resources used by the PDCCH candidates whose AL=2 and AL=1 are locations of time-frequency resources used by PDCCH candidates whose AL=2.

It may be learned from FIG. 13A and FIG. 13B that, in the foregoing two resource sharing manners, locations of time-frequency resources used by PDCCH candidates at different ALs are different. When learning of the locations of the time-frequency resources used by the PDCCH candidates at different ALs, a terminal may obtain, through analysis, whether a resource sharing manner used by the PDCCH candidates at different ALs is the first resource sharing manner or the second resource sharing manner.

It should be understood that the channel estimation can be more reusable in the first resource sharing manner. A blocking probability can be reduced in the second resource sharing manner.

In this embodiment, a network device may determine, depending on whether a first resource exists in a time unit, locations of time-frequency resources used by PDCCH candidates at different ALs in a CORESET in the time unit, in other words, determine a resource sharing manner used by the PDCCH candidates at different ALs in the CORESET in the time unit. In this embodiment, different control channel parameters refer to different resource sharing manners used by the PDCCH candidates at different ALs in the CORESET. In the different control channel parameters, resource locations of the CORESET may be the same or different. Specific policies are as follows:

1. If no first resource exists in a time unit, the second resource sharing manner is used by the PDCCH candidates at different ALs in the CORESET in the time unit. In this way, the blocking probability can be reduced.

2. If a first resource exists in a time unit, the first resource sharing manner is used by the PDCCH candidates at different ALs in the CORESET in the time unit. In this way, the channel estimation can be more reusable.

In Embodiment 4, first configuration information may include an index of a resource (such as a CCE) in the control resource set and PDCCH candidates at one or more ALs that are mapped to the resource. In this way, the terminal may obtain, through analysis based on the index of the resource, locations of resources used by PDCCH candidates at different ALs, and finally determine which resource sharing manner is used by the PDCCH candidates at different ALs. This disclosure is not limited thereto, and the control channel parameter may further include other information that may be used to indicate the resource sharing manner used by the PDCCH candidates at different ALs, which is not limited herein.

Optionally, the first configuration information may also include indication information of the first resource sharing manner or indication information of the second resource sharing manner. For example, a flag bit for indicating a resource sharing manner is set in the first configuration information. The first resource sharing manner is indicated when the flag bit is "1." The second resource sharing manner is indicated when the flag bit is "0." The foregoing example is merely used to explain this disclosure and shall not be construed as a limitation.

In Embodiment 4, the network device may send the first configuration information by using higher layer signaling (such as RRC signaling), or may send the first configuration information by using physical layer signaling (such as DCI). Signaling used for sending the first configuration information is not limited in this embodiment.

It may be understood that, in Embodiment 4, the network device determines, depending on whether the first resource exists in the time unit, the resource sharing manner used by the PDCCH candidates at different ALs in the control resource set, so that a frequency diversity gain can be improved as much as possible, and the channel estimation can be more reusable.

In addition, this disclosure further provides two methods for configuring control channel parameters. The following respectively describes the two methods with reference to FIG. 14A and FIG. 14B.

As shown in FIG. 14A, all resource locations of a control resource set (CORESET) in different time units may be the same. When a first resource (for example, a resource used by a PBCH) exists in a time unit, the control resource set may be distributed on two sides of the first resource on a symbol, similar to "bypassing" the first resource.

As shown in FIG. 14B, all resource locations of a control resource set (CORESET) in different time units may be the same. When a first resource (for example, a resource used by a PBCH) exists in a time unit, data mapped to the first resource may be discarded in the control resource set on the symbol, similar to "puncturing" the control resource set.

Specifically, first configuration information may further include indication information, and the indication information is used to indicate whether the manner shown in FIG. 14A or the manner shown in FIG. 14B is used by the control channel parameters in the time unit in which the first resource exists.

FIG. 15 shows a wireless communications system, a terminal, and a network device according to this disclosure. A wireless communications system to includes a terminal 400 and a network device 500. The terminal 400 may be the terminal 200 in FIG. 4 in the foregoing embodiment, the network device 500 may be the network device 300 in FIG. 5 in the foregoing embodiment, and the wireless communications system to may be the wireless communications system 100 described in FIG. 3. The following separately provides descriptions.

As shown in FIG. 15, the terminal 400 may include a processing unit 401 and a communications unit 403.

The communications unit 403 may be adapted to receive first configuration information from the network device 500, where the first configuration information includes at least two sets of control channel parameters, and each set of the at least two sets of control channel parameters corresponds to information about at least one time unit.

The processing unit 401 may be adapted to determine, based on a time unit index and the first configuration information, a control channel parameter corresponding to the time unit index. Herein, the time unit index belongs to time units corresponding to the at least two sets of control channel parameters.

Specifically, for detailed implementation of function units included in the terminal 400, refer to the foregoing embodiments. Details are not described herein again.

As shown in FIG. 15, the network device 500 may include a communications unit 501 and a processing unit 503.

The processing unit 503 may be adapted to configure the at least two sets of control channel parameters, where each set of the at least two sets of control channel parameters corresponds to the information about the at least one time unit.

The communications unit 501 may be adapted to send the first configuration information to the terminal 400, where the first configuration information includes the at least two sets of control channel parameters.

Specifically, for detailed implementation of function units included in the network device 500, refer to the foregoing embodiments. Details are not described herein again.

In conclusion, in this disclosure, the network device determines the control channel parameters respectively corresponding to the plurality of time units, and sends, to the terminal, the indication information used to indicate the at least two sets of control channel parameters configured by the network device for the terminal. Correspondingly, the terminal may determine, based on the indication information and a time unit (or some time units), a control channel parameter corresponding to the time unit (or the some time units). Flexible configuration of the control channel parameter can be implemented by performing the foregoing solution.

It may be understood that when the embodiments of this disclosure are applied to a network device chip, the network device chip implements functions of the network device in the foregoing method embodiments. The network device chip sends the first configuration information to another module (such as a radio frequency module or an antenna) in the network device. The first configuration information is sent to the terminal by using the another module in the network device.

When the embodiments of this disclosure are applied to a terminal chip, the terminal chip implements functions of the terminal in the foregoing method embodiments. The terminal chip receives the first configuration information from another module (such as a radio frequency module or an antenna) in the terminal, where the first configuration information is sent by the network device to the terminal.

A person of ordinary skill in the art will understand that all or some of the processes of the methods in the embodiments may be implemented by a computer program instructing relevant hardware. The program may be stored in a computer-readable storage medium. When the program is executed, the processes of the method embodiments may be performed. The foregoing storage medium includes any medium that can store program code, such as a ROM, a random access memory RAM, a magnetic disk, or an optical disc.

What is claimed is:

1. A method, comprising:
   receiving, by a communication apparatus from a network device, first configuration information, wherein:
      the first configuration information comprises at least two sets of one or more control channel parameters;
      each set of the at least two sets of one or more control channel parameters corresponds to at least one time unit; and
      the at least two sets of one or more control channel parameters correspond to a same numerology of a first service, a first set of the at least two sets of one or more control channel parameters differing from a second set of the at least two sets of one or more control channel parameters, a control resource set corresponding to another numerology of a second service being present in the at least one time unit corresponding to the first set of the at least two sets of one or more control channel parameters, the second service being different than the first service; and
   determining, by the communication apparatus based on an index of a time unit and the first configuration information, a selected set of one or more control channel parameters, from the at least two sets of one or more control channel parameters, corresponding to the time unit represented by the index.

2. The method according to claim 1, wherein at least one set of the at least two sets of one or more control channel parameters corresponds to a plurality of time unit indexes.

3. The method according to claim 1, wherein:
   the selected set of one or more control channel parameters comprises a resource location corresponding to a control resource set; and the resource location corresponding to the control
resource set comprises:
a resource start location and a resource end location
that correspond to the control resource set; or
a resource start location corresponding to the control
resource set and a resource span corresponding to the
control resource set.

4. The method according to claim 3, wherein:
the selected set of one or more control channel parameters
comprises a mapping manner between a first resource
group and a second resource group in the control
resource set;
the first resource group comprises the second resource
group;
the mapping manner between the first resource group and
the second resource group comprises a quantity of
second resource groups included in a third resource
group, wherein the first resource group comprises the
third resource group, and the third resource group
comprises the second resource group.

5. The method according to claim 1, wherein:
the selected set of one or more control channel parameters
comprises a mapping manner between a physical
downlink control channel candidate and a first resource
group;
the physical downlink control channel candidate is carried
on the first resource group; and
the mapping manner between the physical downlink control channel candidate and the first resource group
comprises:
mapping the physical downlink control channel candidate to L first resource groups that are consecutive in
frequency domain; or
mapping the physical downlink control channel candidate to L first resource groups that are inconsecutive
in frequency domain, wherein
L is a positive integer and represents an aggregation
level of the physical downlink control channel candidate.

6. The method according to claim 1, wherein the selected
set of one or more control channel parameters comprises:
locations of resources used by physical downlink control
channel candidates at different aggregation levels in a
control resource set; and
an index of a resource in the control resource set and
physical downlink control channel candidates at one or
more aggregation levels that are mapped to the
resource.

7. The method according to claim 1, wherein the time unit
is:
a time domain symbol;
a mini-slot;
a slot;
a subframe; or
a frame.

8. An apparatus comprising:
a non-transitory memory storage comprising instructions;
and
one or more processors in communication with the
memory storage, wherein the one or more processors
execute the instructions to perform operations comprising:
receiving first configuration information from a network device, wherein:
the first configuration information comprises at least
two sets of one or more control channel parameters;

each set of the at least two sets of one or more control
channel parameters corresponds to at least one
time unit; and
the at least two sets of one or more control channel
parameters correspond to a same numerology of a
first service, a first set of the at least two sets of
one or more control channel parameters differing
from a second set of the at least two sets of one or
more control channel parameters, a control
resource set corresponding to another numerology
of a second service being present in the at least one
time unit corresponding to the first set of the at
least two sets of one or more control channel
parameters, the second service being different than
the first service; and
determining, based on an index of a time unit and the
first configuration information, a selected set of one
or more control channel parameters, from the at least
two sets of one or more control channel parameters,
corresponding to the time unit represented by the
index.

9. The apparatus according to claim 8, wherein at least
one set of the at least two sets of one or more control channel
parameters corresponds to a plurality of time unit indexes.

10. The apparatus according to claim 8, wherein:
the selected set of one or more control channel parameters
comprises a resource location corresponding to a control resource set; and
the resource location corresponding to the control
resource set comprises:
a resource start location and a resource end location
that correspond to the control resource set; or
a resource start location corresponding to the control
resource set and a resource span corresponding to the
control resource set.

11. The apparatus according to claim 10, wherein:
the selected set of one or more control channel parameters
comprises a mapping manner between a first resource
group and a second resource group in the control
resource set;
the first resource group comprises the second resource
group; and
the mapping manner between the first resource group and
the second resource group comprises a quantity of
second resource groups included in a third resource
group, wherein the first resource group comprises the
third resource group, and the third resource group
comprises the second resource group.

12. The apparatus according to claim 8, wherein:
the selected set of one or more control channel parameters
comprises a mapping manner between a physical
downlink control channel candidate and a first resource
group;
the physical downlink control channel candidate is carried
on the first resource group; and
the mapping manner between the physical downlink control channel candidate and the first resource group
comprises:
mapping the physical downlink control channel candidate to L first resource groups that are consecutive in
frequency domain; or
mapping the physical downlink control channel candidate to L first resource groups that are inconsecutive
in frequency domain, wherein
L is a positive integer and represents an aggregation
level of the physical downlink control channel candidate.

13. The apparatus according to claim 8, wherein the selected set of one or more control channel parameters comprises:
   locations of resources used by physical downlink control channel candidates at different aggregation levels in a control resource set; and
   an index of a resource in the control resource set and physical downlink control channel candidates at one or more aggregation levels that are mapped to the resource.

14. The apparatus according to claim 8, wherein the time unit is:
   a time domain symbol;
   a mini-slot;
   a slot;
   a subframe; or
   a frame.

15. An apparatus comprising:
   a non-transitory memory storage comprising instructions; and
   one or more processors in communication with the non-transitory memory storage, wherein the one or more processors execute the instructions to perform operations comprising:
      determining at least two sets of control channel parameters, wherein:
         each set of the at least two sets of control channel parameters corresponds to at least one time unit; and
         the at least two sets of control channel parameters correspond to a same numerology of a first service, a first set of the at least two sets of control channel parameters differing from a second set of the at least two sets of control channel parameters, a control resource set corresponding to another numerology of a second service being present in the at least one time unit corresponding to the first set of the at least two sets of control channel parameters, the second service being different than the first service; and
      sending first configuration information to a terminal, wherein the first configuration information comprises the at least two sets of control channel parameters and, for each of the at least two sets of control channel parameters, an indication of the at least one time unit to which the set of control channel parameters corresponds.

16. The apparatus according to claim 15, wherein at least one set of the at least two sets of control channel parameters corresponds to a plurality of time unit indexes.

17. The apparatus according to claim 15, wherein:
   a particular set of one or more control channel parameters of the at least two sets of control channel parameters comprises a resource location corresponding to a control resource set; and
   the resource location corresponding to the control resource set comprises:
      a resource start location and a resource end location that correspond to the control resource set; or
      a resource start location corresponding to the control resource set and a resource span corresponding to the control resource set.

18. The apparatus according to claim 17, wherein:
   the particular set of one or more control channel parameters comprises a mapping manner between a first resource group and a second resource group in the control resource set;
   the first resource group comprises the second resource group; and
   the mapping manner between the first resource group and the second resource group comprises a quantity of second resource groups included in a third resource group, wherein the first resource group comprises the third resource group, and the third resource group comprises the second resource group.

19. The apparatus according to claim 15, wherein:
   a particular set of one or more control channel parameters of the at least two sets of control channel parameters comprises a mapping manner between a physical downlink control channel candidate and a first resource group;
   the physical downlink control channel candidate is carried on the first resource group; and
   the mapping manner between the physical downlink control channel candidate and the first resource group comprises:
      mapping the physical downlink control channel candidate to L first resource groups that are consecutive in frequency domain; or
      mapping the physical downlink control channel candidate to L first resource groups that are inconsecutive in frequency domain, wherein
      L is a positive integer and represents an aggregation level of the physical downlink control channel candidate.

20. The apparatus according to claim 15, wherein the time unit is:
   a time domain symbol;
   a mini-slot;
   a slot;
   a subframe; or
   a frame.

* * * * *